United States Patent
Rezaiifar et al.

(10) Patent No.: US 7,916,715 B2
(45) Date of Patent: Mar. 29, 2011

(54) HYBRID PROTOCOL TO SUPPORT COMMUNICATIONS WITH MULTIPLE NETWORKS

(75) Inventors: Ramin Rezaiifar, San Diego, CA (US); Paul E. Bender, San Diego, CA (US); Parag A. Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 971 days.

(21) Appl. No.: 10/692,907

(22) Filed: Oct. 23, 2003

(65) Prior Publication Data

US 2004/0120283 A1 Jun. 24, 2004

Related U.S. Application Data

(60) Provisional application No. 60/434,772, filed on Dec. 18, 2002, provisional application No. 60/454,385, filed on Mar. 12, 2003.

(51) Int. Cl.
*H04L 12/66* (2006.01)
*H04L 12/56* (2006.01)
*H04W 24/00* (2009.01)

(52) U.S. Cl. ............... 370/352; 370/401; 455/456.2

(58) Field of Classification Search .................. None
See application file for complete search history.

(56) References Cited

U.S. PATENT DOCUMENTS

| | | | |
|---|---|---|---|
| 5,745,695 A | 4/1998 | Gilchrist et al. | |
| 5,982,774 A * | 11/1999 | Foladare et al. | 370/401 |
| 6,112,084 A * | 8/2000 | Sicher et al. | 370/337 |
| 6,188,886 B1 * | 2/2001 | Macaulay et al. | 455/415 |
| 6,198,945 B1 * | 3/2001 | Chen et al. | 455/560 |
| 6,230,009 B1 * | 5/2001 | Holmes et al. | 455/426.1 |
| 6,253,249 B1 * | 6/2001 | Belzile | 709/249 |
| 6,353,611 B1 * | 3/2002 | Norris et al. | 370/356 |
| 6,529,497 B1 * | 3/2003 | Hjelm et al. | 370/347 |
| 6,560,239 B1 * | 5/2003 | Frid et al. | 370/426 |
| 6,937,861 B2 * | 8/2005 | Vanghi | 455/436 |
| 6,985,494 B2 * | 1/2006 | Thompson | 370/466 |
| 7,027,814 B1 * | 4/2006 | Koivupuro et al. | 455/435.1 |
| 7,031,747 B2 * | 4/2006 | Cyr et al. | 455/552.1 |
| 7,068,669 B2 | 6/2006 | Abrol et al. | |
| 2001/0036172 A1 * | 11/2001 | Haskal | 370/352 |

(Continued)

FOREIGN PATENT DOCUMENTS

JP 2005509325 4/2005

(Continued)

OTHER PUBLICATIONS

TIA/EIA/IS-95-B, "Mobile Station-Base Station Compatibility Standard for Dual-Mode Wideband Spread Spectrum Cellular Systems," Feb. 3, 1999, Part 1, pp. 1-602.

TIA/EIA/IS-95-B, "Mobile Station-Base Station Compatibility Standard for Dual-Mode Wideband Spread Spectrum Cellular Systems," Feb. 3, 1999, Part 2pp. 1-604.

(Continued)

*Primary Examiner* — Gregory B Sefcheck
(74) *Attorney, Agent, or Firm* — Alin Corie

(57) ABSTRACT

Systems and techniques are disclosed relating to wireless communications. The systems and techniques involve monitoring a first network in accordance with a first air interface, and receiving a message from a second network through the first air interface, the second network being associated with a second air interface different from the first air interface. Various registration and related techniques are also discussed for maintaining connectivity with both networks as the wireless communications device moves through different geographic coverage regions.

90 Claims, 15 Drawing Sheets

U.S. PATENT DOCUMENTS

| | | | |
|---|---|---|---|
| 2002/0097710 A1* | 7/2002 | Burg | 370/352 |
| 2002/0111169 A1 | 8/2002 | Vanghi | |
| 2002/0142753 A1* | 10/2002 | Pecen et al. | 455/411 |
| 2002/0145987 A1* | 10/2002 | Carlsson et al. | 370/329 |
| 2004/0006608 A1* | 1/2004 | Swarna et al. | 709/220 |
| 2004/0090947 A1* | 5/2004 | Wilborn et al. | 370/345 |

FOREIGN PATENT DOCUMENTS

| | | |
|---|---|---|
| KR | 1020020025963 | 4/2002 |
| RU | 2128886 | 4/1999 |
| WO | WO 97/26764 | 7/1997 |
| WO | WO0003554 A1 | 1/2000 |
| WO | 0005907 | 2/2000 |
| WO | WO0016576 A1 | 3/2000 |
| WO | WO 01/10080 A2 | 2/2001 |
| WO | WO 01/31963 A1 | 5/2001 |
| WO | WO02087268 A1 | 10/2002 |

OTHER PUBLICATIONS

TIA/EIA/IS-707-A, "Data Service Options for Spread Spectrum Systems," IS-707, Apr. 1999, pp. 1-437.

TIA/EIA/IS-2000, "Upper Layer (Layer 3) Signaling Standard for cdma2000 Spread Spectrum Systems, Release A—Addendum 1," 3GPP2 C.S0005-A-1, Oct. 27, 2000, pp. 1-1596.

TIA/EIA/IS-856, "cdma2000 High Rate Packet Data Air Interface Specification," 3GPP2 C.S0024, Version 2.0 Oct. 27, 2000, pp. 1-441.

International Search Report—PCT/US03/040414—International Search Authority, European Patent Office—Jul. 29, 2005.

Written Opinion—PCT/US03/040414—IPEA, US—Oct. 25, 2006.

International Preliminary Examination Report—PCT/US03/040414—IPEA, US—Feb. 6, 2007.

* cited by examiner

0- MS CROSSES SUBNET BOUNDARY
1- INITIATE REGISTRATION PROCESS
2- TUNNELED REGISTRATION REQUEST
3- TUNNELED REGISTRATION MESSAGE
4- LOCATION UPDATING REQUEST
5- PSTN PAGES

0 - MS CROSSES SUBNET BOUNDARY
1 - INITIATE REGISTRATION PROCESS
2 - TUNNELED REGISTRATION REQUEST
3 - TUNNELED REGISTRATION MESSAGE
4 - LOCATION UPDATING REQUEST
5 - PSDN PAGES

0- MS CROSSES SUBNET BOUNDARY
1- INITIATE REGISTRATION PROCESS
2- TUNNELED REGISTRATION REQUEST
3- TUNNELED REGISTRATION MESSAGE
4- LOCATION UPDATING REQUEST
5- PSTN PAGES

HYBRID PROTOCOL TO SUPPORT COMMUNICATIONS WITH MULTIPLE NETWORKS

CLAIM OF PRIORITY UNDER 35 U.S.C. §119

The present Application for Patent claims priority to Provisional Application No. 60/434,772, entitled, "DIRECTING COMMUNICATIONS IN A HIGH RATE PACKET DATA COMMUNICATION SYSTEM," filed Dec. 18, 2002, and assigned to the assignee hereof and hereby expressly incorporated by reference herein.

The present Application for Patent claims priority to Provisional Application No. 60/454,385, entitled, "DIRECTING COMMUNICATIONS IN A HIGH RATE PACKET DATA COMMUNICATION SYSTEM," filed Mar. 12, 2003, and assigned to the assignee hereof and hereby expressly incorporated by reference herein.

BACKGROUND

1. Field

The present disclosure relates generally to wireless communications, and more specifically, to various systems and techniques for implementing a hybrid protocol supporting communications with multiple networks.

2. Background

Wireless networks are widely deployed to provide various types of wireless communication services. Numerous air interfaces have been developed over the years to support wireless communications including frequency division multiple access (FDMA), time division multiple access (TDMA), code division multiple access (CDMA), as well as many others. These interfaces have been standardized to facilitate interoperation between equipment manufactured by different companies. By way of example, voice services using CDMA technology has been standardized in the United States in Telecommunications Industry Association TIA/EIA/IS-95-B, entitled "Mobile Station-Base Station Compatibility Standard for Dual-Mode Wideband Spread Spectrum Cellular Systems," and referred to herein as "IS-95." More recently, CDMA technology has been expanded to provide both voice and data services in the United States in Telecommunications Industry Association (TIA), entitled "Upper Layer (Layer 3) Signaling Standard for cdma2000 Spread Spectrum Systems, Release A—Addendum 1," dated Oct. 27, 2000, and referred to herein as "IS-2000." To satisfy the increasing demand for high speed data services, an additional standard has been proposed in TIA, entitled "cdma2000 High Rate Packet Data Air Interface Specification," and referred to herein as "IS-856."

With the rapid expansion of communication services and the various standards that support them, it is highly desirable to develop technology that is compatible with multiple air interface standards. With this technology, a wireless communications device may be used to support voice and low speed data using IS-2000, but rely primarily on IS-856 to support high speed Internet applications. The challenge faced by designers is that each of these standards has their own unique set of protocols, services, data rates, and operating frequencies. Accordingly, there is a need in the art for an innovative approach to support wireless communication devices with multiple air interface standards. The approach should not be limited to devices supporting IS-2000 and IS-856 applications, but should be a broad based solution applicable to devices supporting various other air interface standards.

BRIEF DESCRIPTION OF THE DRAWINGS

Aspects of the present invention are illustrated by way of example, and not by way of limitation, in the accompanying drawings, wherein.

DETAILED DESCRIPTION

Figure 1:
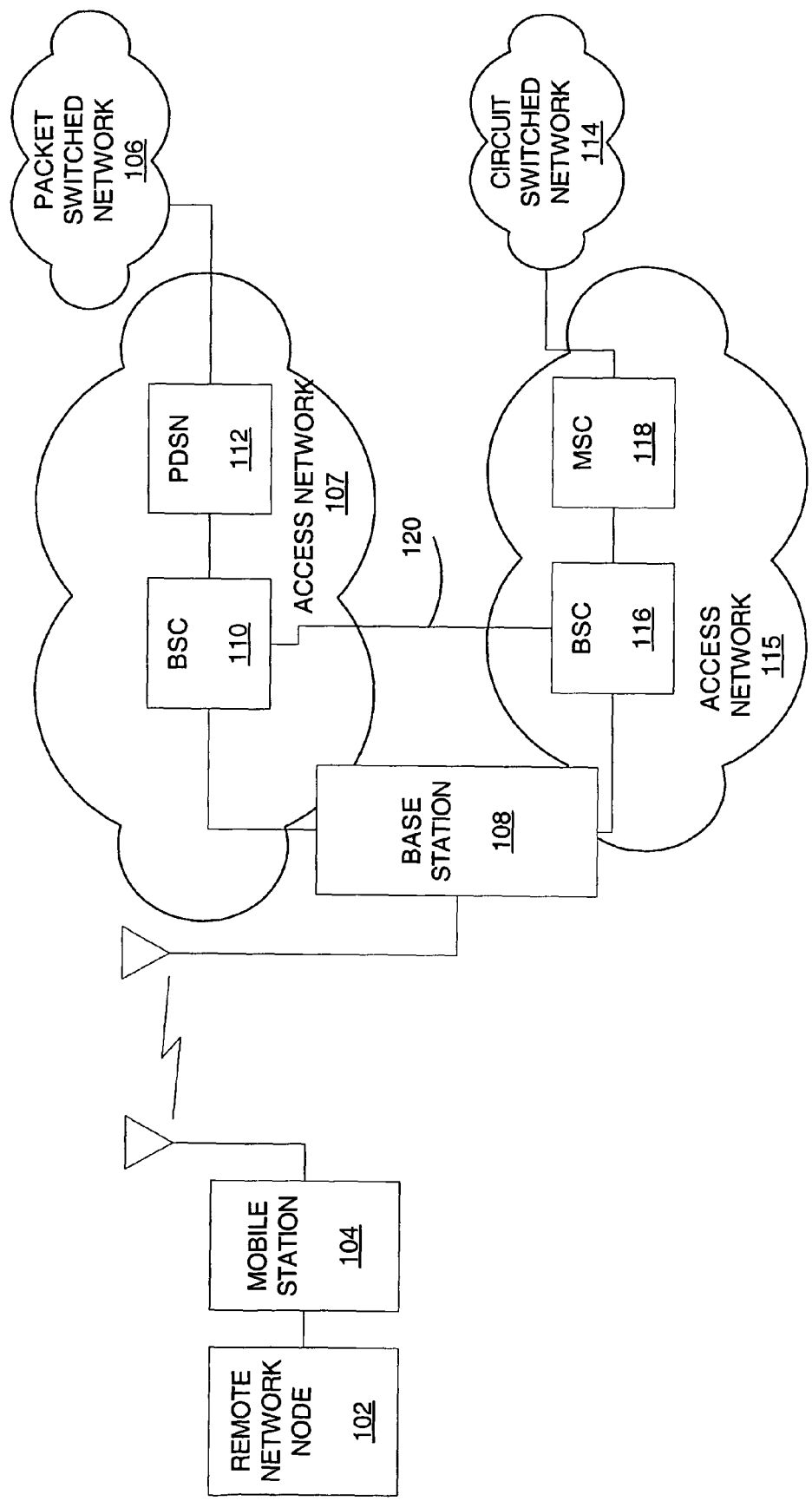
FIG. 1 is a conceptual block diagram of a wireless communications system.

An HDR subscriber station, referred to herein as an access terminal (AT), may be mobile or stationary, and may communicate with one or more HDR base stations, referred to herein as modem pool transceivers (MPTs). An access terminal transmits and receives data packets through one or more modem pool transceivers to an HDR base station controller, referred to herein as a modem pool controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention. In addition, for the purposes of this disclosure, the term "connected" can mean either a direct connection or, where appropriate in the context, an indirect connection, e.g., through intervening or intermediary devices or other means.

In the following detailed description, various aspects of the present invention will be described in the context of a wireless communications device supporting both the IS-2000 and IS-856 air interface standards. While these inventive aspects may be well suited for use with this application, those skilled in the art will readily appreciate that these inventive aspects are likewise applicable for use in devices supporting various other air interface standards. Accordingly, any reference to a communication device with specific air interface standards is intended only to illustrate the inventive aspects, with the understanding that such inventive aspects have a wide range of applications. The International Telecommunications Union recently requested the submission of proposed methods for providing high rate data and high-quality speech services over wireless communication channels. A first of these proposals was issued by the Telecommunications Industry Association, entitled "The IS-2000 ITU-R RTT Candidate Submission." A second of these proposals was issued by the European Telecommunications Standards Institute (ETSI), entitled "The ETSI UMTS Terrestrial Radio Access (UTRA) ITU-R RTT Candidate Submission," also known as "wideband CDMA" and hereinafter referred to as "W-CDMA." A third proposal was submitted by U.S. TG 8/1 entitled "The UWC-136 Candidate Submission," hereinafter referred to as "EDGE." The contents of these submissions are public record and are well known in the art. IS-95 was originally optimized for transmission of variable-rate voice frames. Subsequent standards have built on the standard to support a variety of additional non-voice services including packet data services. One such set of packet data services was standardized in the United States in Telecommunications Industry Association TIA/EIA/IS-707-A, entitled "Data Service Options for Spread Spectrum Systems," incorporated by reference herein, and hereafter referred to as "IS-707." A remote network node such as a personal or laptop computer (PC) connected to a packet-data-capable wireless mobile station (MS) may access the Internet through a wireless network in accordance with the IS-707 standard. As used throughout the following description, the terms MS, Access Node (AN), Mobile Node (MN) and remote station, each refer to a mobile participant in a wireless communication. Alternatively, the remote network node such as a web browser may be built-in to the MS, making the PC optional. An MS may be any of a number of types of devices including, but not limited to PC card, personal data assistant (PDA), external or internal modem, or wireless phone or terminal. The MS sends data through the wireless network, where it is processed by a packet data serving node (PDSN). The PPP state for a connection between an MS and the wireless network is typically maintained within the PDSN. The PDSN is connected to an IP network such as the Internet, and transports data between the wireless network and other entities and agents connected to the IP network. In this way, the MS can send and receive data to another entity on the IP network through the wireless data connection. The target entity on the IP network is also called a correspondent node.

FIG. 1 is a conceptual block diagram of a wireless communications system configured to support packet-switched communications. A remote network node 102 such as a personal or laptop computer (PC) connected to a subscriber station 104 may access a packet data network 106 through an access network 107. Alternatively, the remote network node 102 may be integrated into the subscriber station 104 such as the case might be with a web browser. The subscriber station 104 may be any number of devices including, but not limited to, a PC card, a personal data assistant (PDA), an external or internal modem, a wireless phone or terminal, or any other similar device. The packet-switched network 106 may be the Internet, a corporate intranet, or any other packet data network.

The access network 107 may be implemented with any number of base stations dispersed throughout a geographic region. The geographic region may be subdivided into smaller regions known as cells with each base station serving a cell. For simplicity, one base station 108 serving a singular cellular region is shown in FIG. 1. A base station controller (BSC) 110 configured for packet-switched communications may be used to coordinate the activities of multiple base stations. A packet control function (PCF) may be integrated into the BSC 110 to control the interface with a packet data serving node (PDSN) 112. The PDSN 112 may be used to maintain and terminate a network connection with the remote network node 102. The geographic reach of the access network 107 may be extended by connecting multiple BSCs to the PDSN 112, with each BSC supporting any number of base stations.

The wireless communications system may also be configured to support circuit-switched communications. Separate radio resources at the base station 108 may be used to connect the subscriber station 104 to a circuit-switched network 114 through an access network 115. The circuit-switched network 114 may be a public switched telephone network (PSTN) or the like. The access network 115 may be implemented with a BSC 116, which interfaces the base station 108 to a mobile switching center (MSC) 118. The MSC 118 provides a gateway to the circuit-switched network 114. The geographic reach of the access network 115 may be expanded by using the MSC 118 to interface any number of BSCs to the circuit-switched network 114, with each BSC supporting one or more base stations.

The subscriber station 104 may be configured to monitor the circuit-switched network 114 when power is initially applied using a predetermined access procedure. The access procedure involves tuning the subscriber station 104 to the operating frequency assigned to circuit-switched communications, acquiring the pilot signal transmitted from that base station 108, and registering with the MSC 118 using a reverse link access channel. The reverse link refers to transmissions from the subscriber station 104 to the base station 108, and a forward link refers to transmissions from the base station 108 to the subscriber station 104. Once the subscriber station 104 is registered, it may monitor a forward link paging channel. The paging channel may be used by the base station 108 to page the subscriber station 104 when a voice call arrives. In response to the page, the subscriber station 104 may send a control message to the base station 108 over the reverse link access channel indicating that it is ready to receive the call. In the case where the subscriber station 104 initiates the call, the reverse link access channel may be used to send a control message to the base station 108 indicating that the subscriber station 104 is ready to place a call. In any event, in response to communications over the reverse link access channel, an air link may be established between the subscriber station 104 and the base station 108 to support the call. As used throughout the following description, the term "air link" refers to a wireless traffic channel configured to support voice and/or data communications. The pilot, paging, access and other overhead channels are always active whether or not an air link exists.

When the subscriber station 104 is not being used to support a voice call, it may provide a high speed network connection to the packet-switched network 106 for the remote network node 102. The remote network node 102 may access the packet-switched network 106 by first establishing an air link with the base station 108. This may be accomplished by tuning the subscriber station 104 to the operating frequency assigned to packet-switched communications and acquiring the pilot signal transmitted from that base station 108. The pilot signal for packet-switched communications is transmitted at a different carrier frequency than the pilot signal for circuit-switched communications. Once the air link is established, a data link may be set up between the remote network node 102 and the PDSN 112 in accordance with a point-to-point (PPP) link layer protocol. Next, the PPP link layer protocol may be used to negotiate an Internet Protocol (IP) address to assign to the remote network node 102. Once an IP address is assigned, the remote network node 102 may communicate with the packet-switched network 106 over a network connection.

In IS-856 compliant packet-switched communications, a network connection remains in tact whether or not it is being used to support communications. By way of example, the remote network node 102 may access the packet-switched network 106 to download a web page. A period of inactivity over the network connection may exist after the web page is downloaded while the user reads the contents. During such periods of inactivity, the air link between the subscriber station 104 and the base station 108 may be torn down to preserve valuable wireless resources. The network connection that exists between the remote network node 102 and the PDSN 112 in the absence of an air link is referred to as a "dormant" connection. When network communications are ready to resume, an "active" network connection may be established with a new air link between the subscriber station 104 and the base station 108 without having to renegotiate the IP address or the PPP state. By maintaining the network connection, bandwidth can be saved that would otherwise be consumed by renegotiating the IP address and PPP state, thereby reducing the latency of the network communications.

When the network connection is dormant, the subscriber station 104 may be configured to retune to the operating frequency assigned to circuit-switched communications and acquire the associated forward link pilot signal. To avoid tuning back-and-forth between the two carrier frequencies when a high speed packet-switched network connection exists, the subscriber station 104 may remain tuned to the operating frequency assigned to packet-switched communications for a short period of time after the network connection becomes dormant before switching to the operating frequency assigned to circuit-switched communications. In any event, once the subscriber station 104 tunes to the operating frequency assigned to circuit-switched communications, it may then monitor the reverse link paging channel associated with such communications to avoid missing a call.

The base station 108 may use a slotted paging procedure to support voice-switched communications. In the slotted paging mode, both the subscriber station 104 and the base station 108 agree in which time slots the subscriber station 104 will be paged. The subscriber station 104 may then power down some of its processing resources during unassigned time slots, thus conserving battery power.

The subscriber station 104 may also be configured to periodically tune to the operating frequency assigned to packet-switched communications, acquire the associated reverse link pilot signal, and check the paging channel when the network connection is dormant. Although this approach may support continued high speed access to the packet-switched network 106 during the entire PPP session, it also tends to reduce the standby time (i.e., the percentage of time in which the processing resources in the subscriber station 104 can be powered down). Reduced standby time places a higher demand on battery power.

An alternative approach for supporting a dormant network connection is to tunnel the page from the packet-switched network 106 to the subscriber station 104 through the air interface for circuit-switched communications, in this example the IS-2000 air interface. The PCF in the BSC 110 may be used to determine whether the network connection is dormant and buffer data packets from the PDSN 112 when the air link is down or when its resources are insufficient to support the flow of packets from the PDSN 112. The BSC 110 connected to the packet-switched network 106 may be configured to instruct the BSC 116 connected to the circuit-switched network to page the subscriber station 104 when the PCF determines that packets have arrived from the PDSN 112 during a dormant network connection. A connection 120 between the BSCs may be used to implement this function. In response to an instruction from the BSC 110 connected to the packet-switched network 106 to page the subscriber station 104, the BSC 116 connected to the circuit-switched network 114 may send a command to the base station 108, which in turn pages the subscriber station 104 through the IS-2000 air interface.

Once a page is received by the subscriber station 104 indicating that data packets have arrived at the PCF, the subscriber station 104 may switch back to the operating frequency assigned to packet-switched communications and acquire the associated reverse link pilot signal. Next, the subscriber station 104 may send a signal back to the base station 108 on an overhead channel indicating that it is ready to receive the data packets. The base station 108 may then forward the signal to the BSC 110 connected to the packet-switched network 106 which activates the network connection between the subscriber station 104 and the PDSN 112.

A similar methodology may be implemented to avoid missing voice pages when the network connection is active. More specifically, a page from the circuit-switched network 114 may be tunneled through the air interface for packet-switched communications to the subscriber station 104, in this example the IS-856 air interface. This may be accomplished by instructing the BSC 110 connected to the packet switched network 106 to page the subscriber station 104 when a voice call is received from the circuit-switched network 114. The connection 120 between the BSCs may be used to implement this function. In response to an instruction to page the subscriber station 104, the BSC 110 connected to the packet-switched network 106 may send a command to the base station 108, which in turn pages the subscriber station 104 through the air interface for packet-switched communications, in this example the IS-856 air interface. The subscriber station 104 may configure a filtering mechanism that allows only certain types of pages associated with circuit-switched services to be sent through the IS-856 air interface. By way of example, the subscriber station 104 may request to receive voice pages, but not pages associated with short message services (SMS) while it is tuned to the operating frequency assigned to packet-switched communications.

Once a page is received by the subscriber station 104 indicating that a voice call has arrived, the subscriber station 104 may suspend the transmission of data packets, switch back to the operating frequency assigned to circuit-switched communications and acquire the associated reverse link pilot signal. Next, the subscriber station 104 may send a signal back to the base station 108 over the access channel indicating that it is ready to receive the voice call. In response, an air link may be established between the subscriber station 104 and the base station 108 to support the call.

The various embodiments of a wireless communications system described thus far may be used to support both circuit-switched and packet-switched applications. The subscriber station 104 may be used to maintain a high speed network connection while supporting voice-switched communications, and maintain voice connectivity while supporting packet-switched communications. This type of operation may be maintained even as the subscriber station 104 moves across sub-network boundaries. For ease of explanation, the sub-network boundaries will be the same for packet-switched and circuit-switched communications with each sub-network being defined as the entire geographic region covered by a single MSC. However, those skilled in the art will appreciate that various modifications may be made to the described embodiments to accommodate sub-network boundaries that are different.

Figure 2:
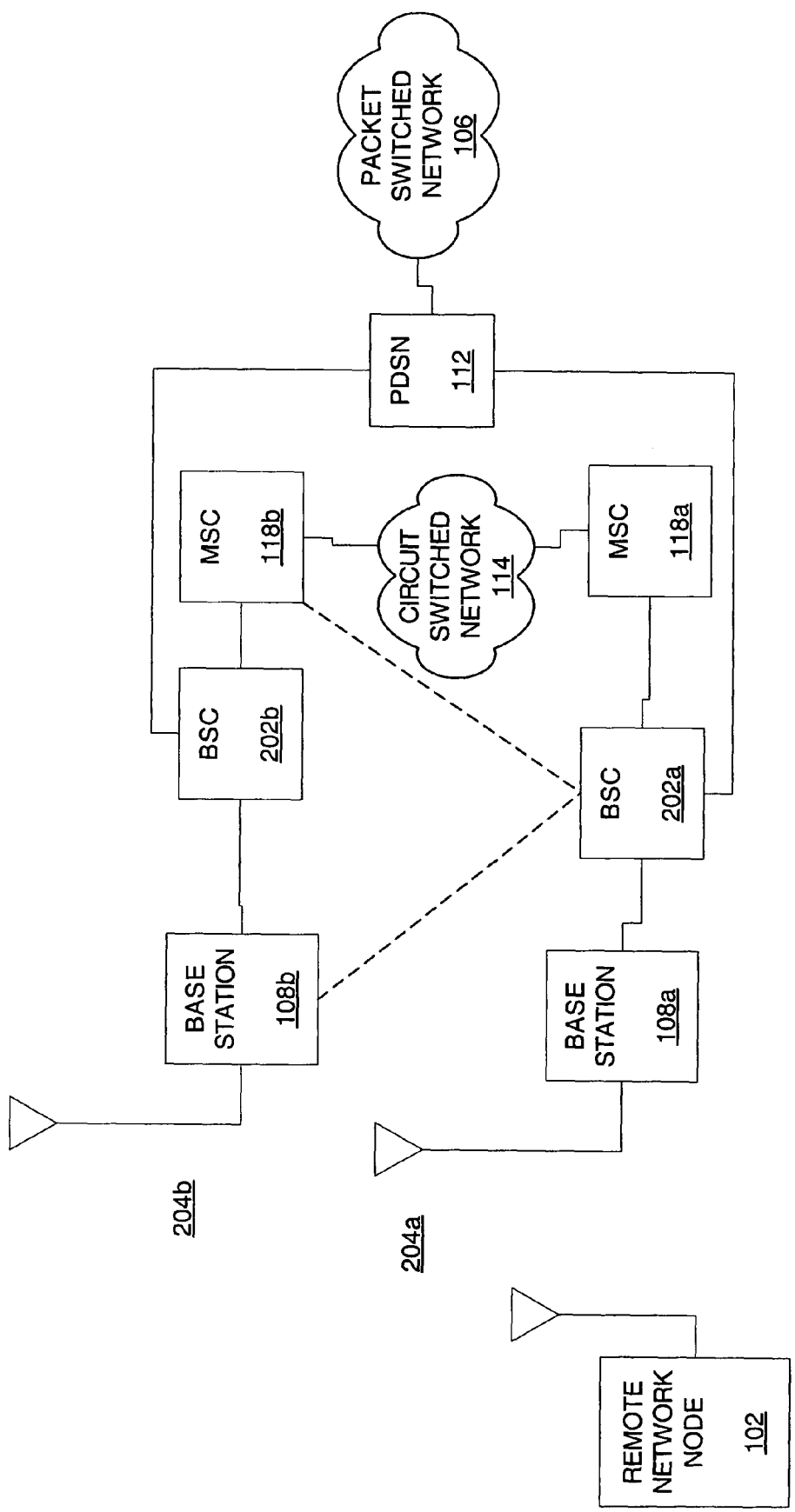
FIG. 2 is a conceptual block diagram of a wireless communications system that extends across geographic coverage regions.

FIG. 2 is a conceptual block diagram illustrating an example of a wireless communications system. A single BSC may be used to support both packet-switched and circuit-switched communications because of the common sub-network boundaries. As explained earlier, the PDSN 112 may be used to establish, maintain and terminate a PPP session with the remote network node 102 during packet-switched communications. In the embodiment shown in FIG. 2, a serving BSC 202a may be used to connect a serving base station 108a to the PDSN 112 and a target BSC 202b may be used to connect a target base station 108b to the PDSN 112.

The subscriber station 104 is shown in FIG. 2 moving through different sub-networks by a series of broken lines. The subscriber station 104 is shown initially moving through a serving region 204a and uses the serving base station 108a to access the packet-switched network 106. When the network connection becomes dormant, the subscriber station 104 may then tune to the operating frequency assigned to voice-switched communications, acquire the associated reverse link pilot signal, and monitor the reverse link paging channel for a voice call. Whether the subscriber station 104 is engaged in an active voice call, or is merely listening for a page from the circuit-switched network 114, it may be desirable to maintain the network connection with the packet-switched network 106 as the subscriber station 104 crosses sub-network boundaries.

The network connection may be maintained by using any number of different procedures. One example will be presented below. As the subscriber station 104 moves toward the target region 202b, it detects changes in the pilot signal strength from both the serving and target base stations 108a and 108b. When the pilot signal strength from the target base station 108b exceeds a threshold, the target base station 108b may be added to the active set of the subscriber station 104. The active set is a list of base stations in communication with the subscriber station 104. The subscriber station 104 may then send a request through the target base station 108b to the target BSC 202b requesting a unique address identifier to support packet-switched communications in the target region 204b. This request is commonly referred to as a "UATI Request" in the IS-856 standard. The request may be tunneled through the air interface for voice-switched communications between the target base station 108b and the subscriber station 104. Included in the request is the unique address identifier of the subscriber station 104 originally assigned to it by the serving BSC 202a to support packet-switched communications in the serving region 204a. The target BSC 202b may use this unique address identifier contained in the request to retrieve the PPP session from the serving BSC 202a. Once the target BSC 202b successfully retrieves the PPP session, it may establish a logical resource connection with the PDSN 112 and tunnel a new unique address identifier assignment to the subscriber station 104 through the air interface for voice-switched communications. The unique address identifier assignment is commonly referred to as a "UATI Assignment" in the IS-856 standard. The logical resource connection between the serving BSC 202a and the PDSN 112 may also be released. The handoff between the serving and target BSCs 202a and 202b does not affect the PPP state of the remote network node 102 thereby maintaining the network connection to the PDSN 112.

When the network connection is active, it may also be desirable to maintain the voice connectivity with the circuit-switched network 114 as the subscriber station 104 crosses sub-network boundaries. Voice connectivity may be maintained by any number of procedures. One example will be presented below. For the purposes of this example, the subscriber station 104 will be described as initially moving through the serving region 204a while supporting an active network connection between the remote network node 102 and the packet-switched network 106. As the subscriber station 104 moves toward the target region 204b, it detects changes in the pilot signal strength from both the serving and target base stations 108a and 108b. This information may be reported back to the serving BSC 202a through the serving base station 108a. In response, the serving BSC 202a, also referred to as an anchor BSC, may be used to register the subscriber station 104 with the target MSC 118b.

Specifically, when the pilot signal strength from the target base station 108b exceeds a threshold, the target base station 108b may be added to the active set of the subscriber station 104. The active set is generally maintained at the BSC, which in this case would be the anchor BSC 202a. The anchor BSC 202a, having knowledge of the target base station 108b covering the region in which the subscriber station 104 is about to enter, may send a message to the subscriber station 104 instructing it to register with the target MSC 118b. The registration request may be the same as specified in the IS-2000 standard, or any other suitable format, and may be tunneled through the air interface for packet-switched communications between the target base station 108b and the subscriber station 104. The registration request may be used by the subscriber station 104 to generate a registration message. A random number in the registration request generated by the anchor BSC 202a may be used to digitally sign the registration message. The registration message may be tunneled back through the air interface for packet-switched communications from to the target base station 108b, and from there, routed to the anchor BSC 202a.

When the registration message is received by the anchor BSC 202a, the signature may be verified, and the information in the registration message may be used to create a location update request. The location update request may be sent to the target MSC 118b to complete the registration process. The anchor BSC 202a may determine the appropriate MSC to send the location update request through an identifier (ID) for the target base station 108b. The target base station ID may be appended to the registration message at the target base station 108b, or accessed separately by the anchor BSC 202a through an exchange of signaling messages.

Figure 3:
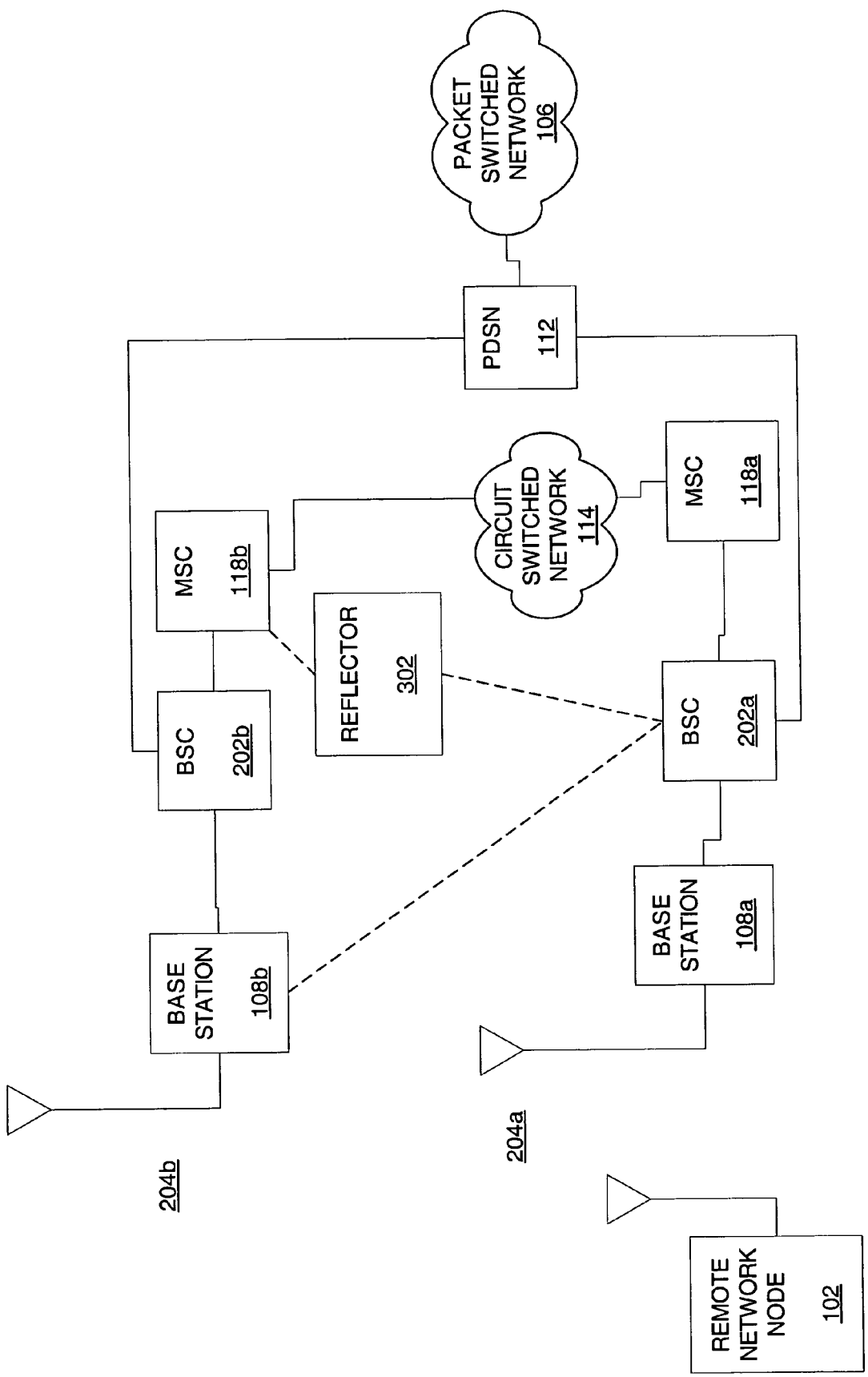
FIG. 3 is a conceptual block diagram of another embodiment of a wireless communications system that extends across geographic coverage regions.

If the anchor BSC 202a cannot reach the target MSC 118b directly, then the anchor BSC 202a may route the location update request through a reflector 302 to the target MSC 118b as illustrated in FIG. 3. The reflector 302 may also be used to route pages from the circuit-switched network 114 between the target MSC 118b and the anchor BSC 202a. To ensure the delivery of pages from the circuit-switched network 114, the reflector 302 may be configured to append a cellular identifier to the location update request of a virtual cell that is bound to the reflector 302. From the perspective of the target MSC 118b, the reflector 302 appears as a BSC. Therefore, the target MSC 118b does not need to be modified in order to maintain voice connectivity during an active network connection.

In an alternative embodiment, the target BSC 202b may be used as a reflector. With this configuration, the location update request may be routed by the anchor BSC 202a through the target BSC 202b to the target MSC 118b. Pages from the circuit-switched network 114 may be routed by the target MSC 118b through the target BSC 202b to the anchor BSC 202a for delivery to the subscriber station 104.

Figure 4:
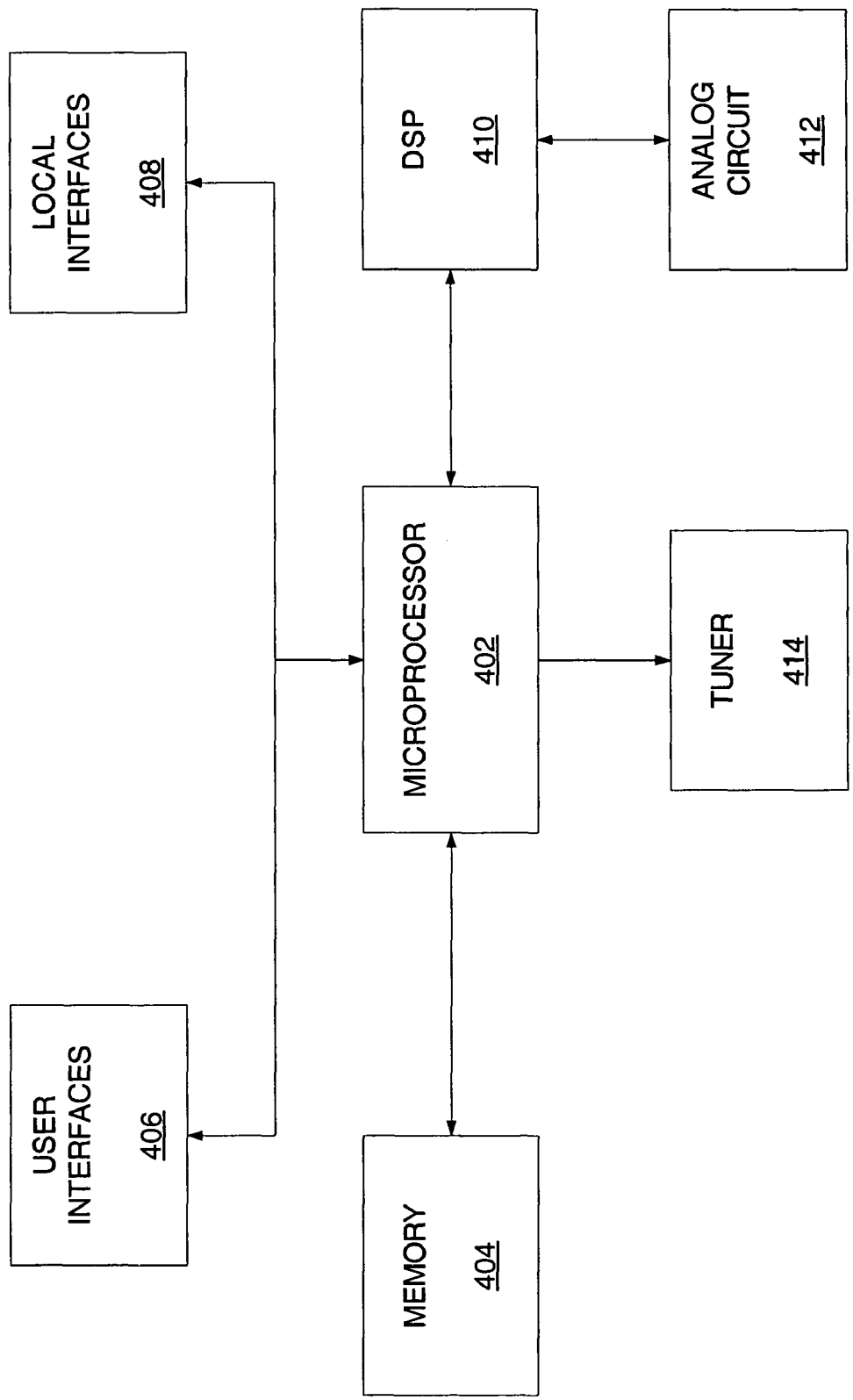
FIG. 4 is a conceptual block diagram of a subscriber station for use in a wireless communications system.

FIG. 4 is a conceptual block diagram illustrating one possible configuration of the subscriber station 104. As those skilled in the art will appreciate, the precise configuration of the subscriber station 104 may vary depending on the specific application and the overall design constraints. For the purposes of clarity and completeness, the various inventive concepts will be described in the context of a CDMA subscriber station; however, such inventive concepts are likewise suitable for use in various other communication devices. Accordingly, any reference to a CDMA subscriber station is intended only to illustrate the various aspects of the present invention, with the understanding that such aspects have a wide range of applications.

The subscriber station 104 may be implemented with a software based processor, or any other configuration known in the art. An example of a hardware configuration for a software based processor is shown in FIG. 4. The processor has a microprocessor 402 at its core with memory 404. The microprocessor 402 may provide a platform to run software programs that, among other things, manage access to the circuit-switched and packet-switched networks.

The subscriber station 104 may also include various user interfaces 406 such as a speaker, microphone, keypad, display, and the like. These user interfaces 406 are generally used to support voice and low rate data communications across the circuit switched network. In some embodiments, the user interfaces 406 may also be used to support a high speed connection to the packet-switched network, such as the case may be with an integrated web browser. In the described embodiment, a local interface 408 may be provided to support a high speed connection between the remote network node and the packet-switched network.

A digital signal processor (DSP) 410 may be implemented with an embedded communications software layer which runs specific algorithms to reduce the processing demands on the microprocessor 402. By way of example, during reverse link communications, the DSP 410 may be used to provide encoding and modulation of communications from either the user interfaces 406 or the local interface 408. In CDMA applications, the DSP 410 may also provide additional functions such as spreading the communications with the appropriate pseudo-random noise (PN) and Walsh codes, and combining the spread communications with various control and overhead channels. The software layer also interfaces the DSP hardware to the microprocessor 402 and may provide low level services such as allocation of resources to allow higher level software programs to run.

The precise manner in which the communications are processed may depend on the air interface for the specific type of communication. By way of example, the encoding and modulation scheme, as well as the way the control and overhead messages are combined may be different depending on whether the communications are destined for the voice-switched or packet-switched network. In any event, the communications processed by the DSP 410 may be provided to an analog circuit 412 for digital-to-analog conversion, amplification, filtering and upconversion to a carrier frequency suitable for transmission over the reverse link.

The carrier frequency produced by the analog circuit 412 may be controlled by a tuner 414. The tuner 414 may be a stand-alone device as shown in FIG. 4, or alternatively, may be integrated into the analog circuit 412. The microprocessor 402 may be used to set the tuner 414 in accordance with the air interface for the particular reverse link transmission. By way of example, the air interface for circuit-switched communications may call for a different carrier frequency than the air interface for packet-switched communications.

In the forward direction, the analog circuit 412 may be used to amplify, filter and downconvert the transmission to a baseband signal. Analog-to-digital conversion of the baseband signal may also be provided by the analog circuit 412. Depending on whether the forward link communications originate from the voice-switched or packet-switched network, the microprocessor 402 sets the tuner 414 in accordance with the appropriate air interface to ensure that the downconversion function of the analog circuit 412 produces a baseband signal.

The baseband signal from the analog circuit 412 may be provided to the DSP 410 which may be used to separate the control and overhead messages from the communications. The control and overhead messages may then be provided to the microprocessor 402. The DSP 410 may also provide additional signal processing functions to the communications including demodulation and decoding. In CDMA applications, the DSP 410 may also provide despreading with the appropriate PN and Walsh codes. The processed communications may then be provided to the microprocessor 402 which manages the delivery of the communications to the various user interfaces 406 and local interface 408.

When power is initially applied to the subscriber station 104, it may attempt to acquire a forward link pilot signal in accordance with the air interface for circuit-switched communications. The microprocessor 402 may be configured to initiate the acquisition process by setting the tuner 414 to the operating frequency for circuit-switched communications. The microprocessor 402 may then invoke various signal processing functions including a search by the DSP 410 through an unknown region of time and frequency to acquire the forward link pilot signal. Once the DSP 410 acquires the forward link pilot signal, it may prompt the microprocessor 402 to add the base station from which the signal was transmitted to its active list. The subscriber station 104 may then communicate with that base station through various control, overhead and traffic channels.

As discussed earlier, the control and overhead messages are separated from the communications in the DSP 410 and provided to the microprocessor 402. The microprocessor 402 may be configured to monitor the control and overhead messages for a page (or any other message) from the packet-switched network tunneled through the air interface for circuit-switch communications. If a page from the packet-switched network is detected by the microprocessor 402, and the subscriber station 104 is not engaged in a voice call, then the tuner 414 may be set to the operating frequency for packet-switched communications. If, on the other hand, the subscriber station 104 is supporting a voice call, the microprocessor 402 may allow the call to be completed before switching the tuner 414. Either way, the microprocessor 402 may then be used to establish an air link with the base station through an exchange of signaling messages. Once the air link is established, a data link and network connection may be established between the PDSN and the remote network node connected to the local interface 408.

During an active network connection, the microprocessor 402 may be used to monitor the control and overhead messages for a page from the circuit-switched network tunneled through the air interface for packet-switched communications. If a page from the circuit-switched network is detected, the microprocessor 402 may be used to signal the base station to suspend the transmission of data packets while the subscriber station takes the call. The signaling to the base station may be provided to the BSC where the PCF may be used to buffer the data packets arriving from the packet-switched network. Once the microprocessor 402 receives an indication from the base station that the transmission of data packets has been suspended, the microprocessor 402 may then set the tuner 414 to the operating frequency for circuit-switch communications, acquire the associated pilot signal, and establish an air link to support the voice call. Once the voice call is complete, the microprocessor 402 may switch the tuner 414 back to the operating frequency for packet-switched communications and complete the data packet transmission.

The microprocessor 402 may also include a timer (not shown) that is triggered when the active network connection becomes dormant. In this embodiment, the microprocessor 402 may be configured to hold the tuner 414 at the operating frequency for packet-switched communications while the timer is running in case the network connection becomes active again. Once the timer times out, the microprocessor 402 may be used to switch the tuner 414 to the operating frequency for circuit-switched communications, acquire the associated pilot signal, and monitor the various control and overhead channels for a voice call.

Figure 5:
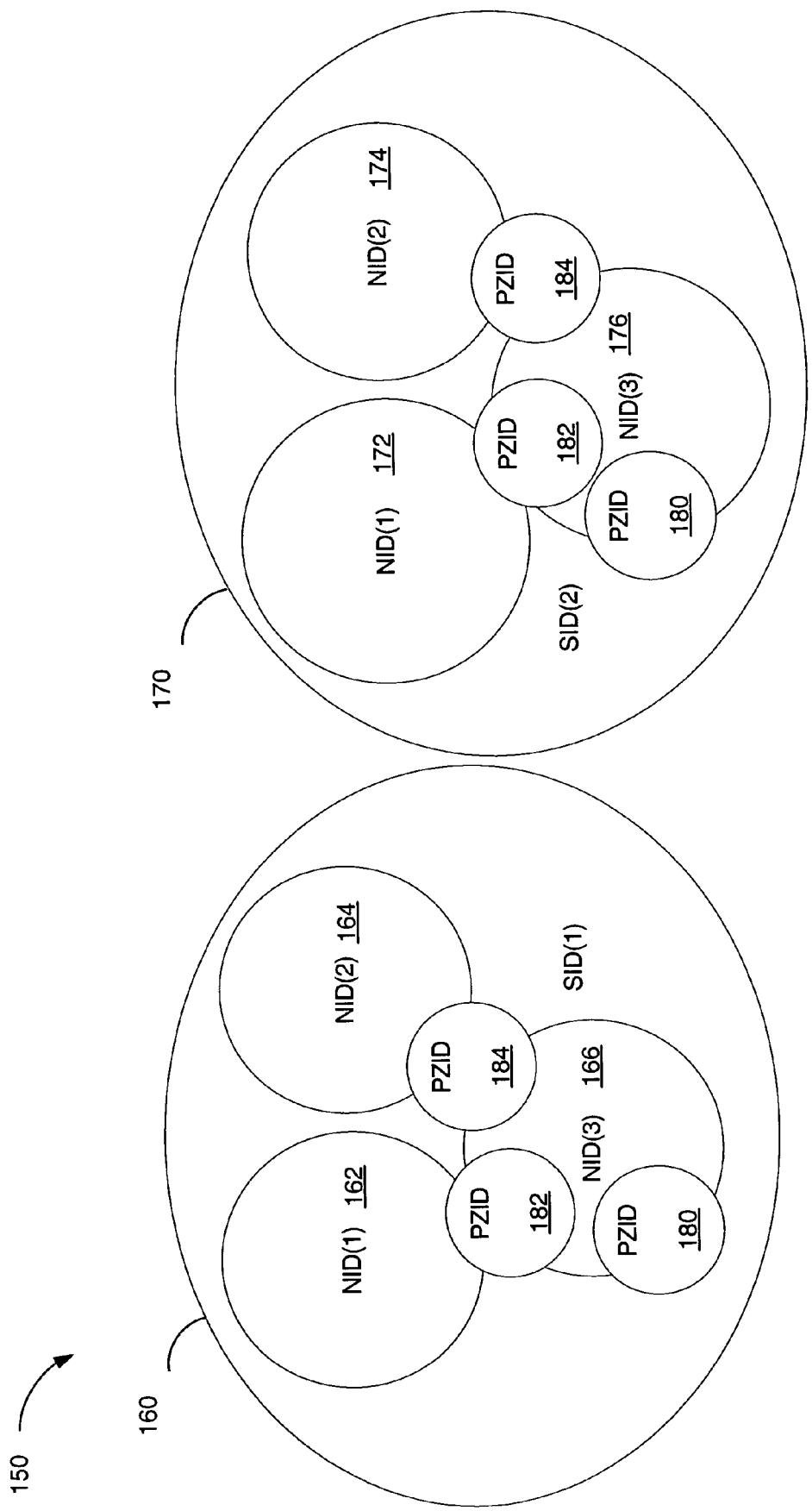
FIG. 5 is a diagram illustrating movement of a mobile station and corresponding configurations in a wireless system configuration.

FIG. 5 illustrates a packet data network 150 according to one embodiment. Note that alternate embodiments may have different terminology for similar functional units, and may incorporate different configurations of components and functional units. For the present discussion, the network 150 of FIG. 5, and other detailed figures, will be used for defining a path; however, alternate embodiments may define a path according to the specific configuration and functions used therein. The packet data system 150 includes two System Identification (SID) zones 160, 170, each having multiple Network Identification (NID) zones 162, 164, 166, 172, 174, and 176. The SID/NID are used in voice systems and generally identify a serving area. For example, an MSC serving area may be associated with a pair of (SID, NID) values. Additionally, several Packet Zone Identifications (PZIDs) are also included within SIDs 160 and 170. Specifically, SID 160 includes PZIDs 180, 182, and 184, while SID 170 includes PZIDs 180, 182, 184.

Figure 6:
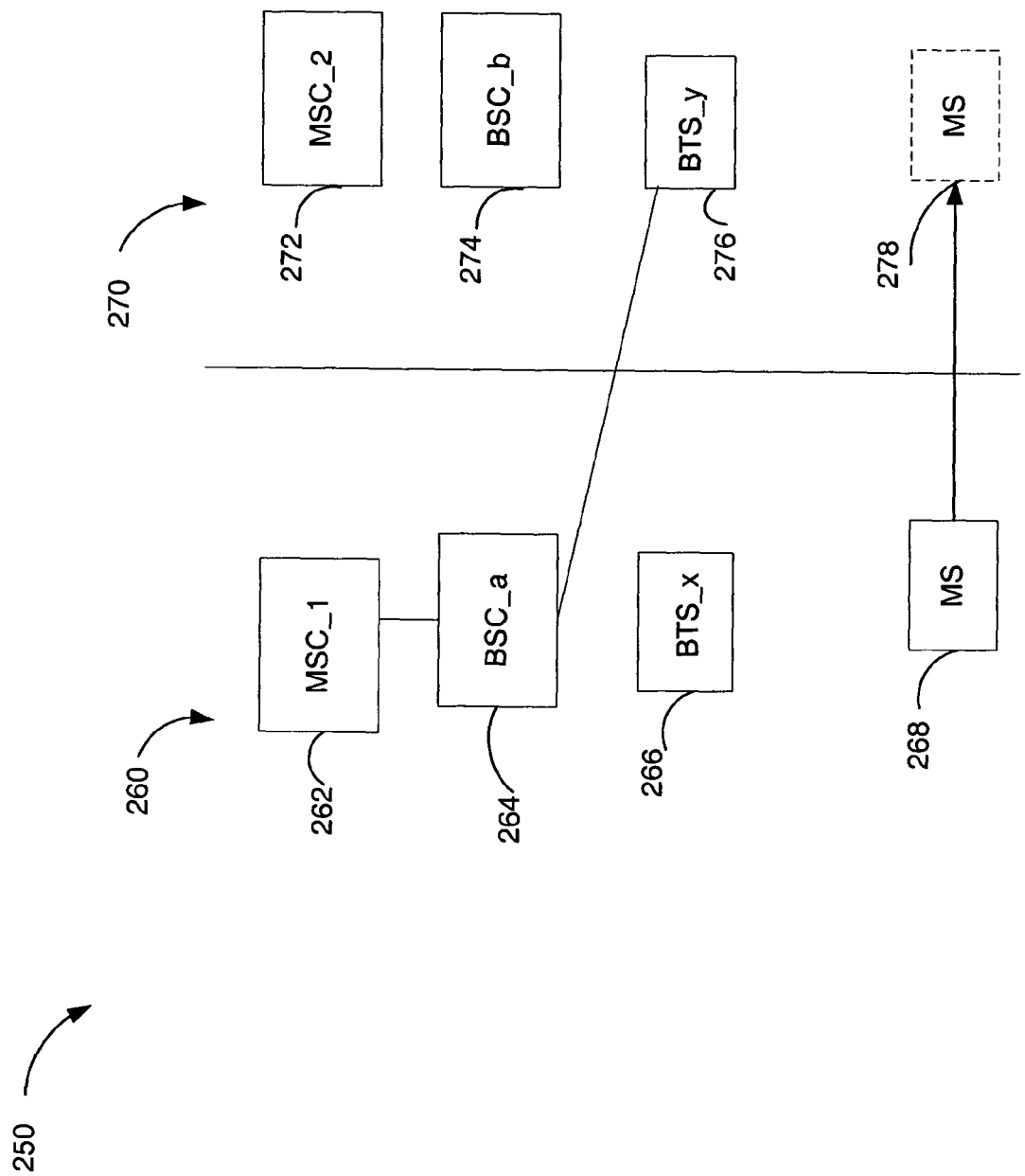
FIG. 6 is a diagram of a wireless system configuration.

FIG. 6 illustrates a wireless communication system 250 configured to support circuit-switched communications and packet-switched communications. A first portion 260 of the system includes a Mobile Switching Center (MSC) identified as MSC_1 262, coupled to a Base Station Controller (BSC) BSC_a 264 and a Base Station Transceiver (BTS) BTS_x 266 adapted for communication with a Mobile Station (MS) 268. While in the first portion 260 of the system, the MS 268 establishes a High Rate Packet Data (HRPD) communication. The HRPD communication may be a high data rate communication, a broadcast communication, or other packet-switched type communication.

The system 250 also includes a second portion 270 including MSC_2 272, BSC_b 274, and BTS_y 276 adapted for communication with mobile stations within portion 270. Each of the portions 260 and 270 covers a geographical area.

As in FIG. 6, when a MS moves into a portion, the MS registers with the corresponding MSC. For circuit-switched communications, such as a voice call, the MSC sends a page to the MS via the BSC and BTS. The MS responds by answering the page and the call is established. As illustrated in FIG. 6, the MS 268 first registers with MSC_1 262 of portion 260. In the present scenario, the MS 268 requests a data service and thereby establishes an HRPD data service. In other words, the MS 268 establishes a packet-switched communication via portion 260. The MS 268 thereafter moves into the geographical area served by portion 270 while maintaining the HRPD data service with portion 270. The MS 268 continues to receive and/or transmit packet data via BSC_a 264. Each of portions 260, 270 may be a sub-net as illustrated in FIG. 6.

As the MS 268 is currently registered with MSC_1 262, new voice calls designated for MS 268 are processed via MSC_1 262. A problem exists when the MS 268 is located within the geographic area of portion 270, but receives a page for a voice call via portion 260. The MS 268 will respond to MSC_2 272, which does not have a context, i.e., registration information, of MS 268. To avoid this and other problems associated with the movement of the MS within a system supporting both circuit-switched and packet-switched communications, a hybrid protocol is presented. The hybrid protocol provides a means for processing communications through both a circuit-switched network and a packet-switched network. For example, a mobile station may desire to use a data service while maintaining connectivity for voice calls.

The hybrid protocol ensures that the MS 268 stays registered in the circuit-switched system, which in the present example is an IS-2000 system. According to the hybrid protocol, the BSC_a 264 is referred to as an "anchor" BSC. The anchor BSC, BSC_a 264, registers the MS 268 with MSC_2 272 as the MS 268 enters the foot-print of MSC_2 272. Movement of the MS 268 into the geographic area or foot-print served by another MSC triggers the anchor BSC to register the MS with that MSC.

Figure 7:
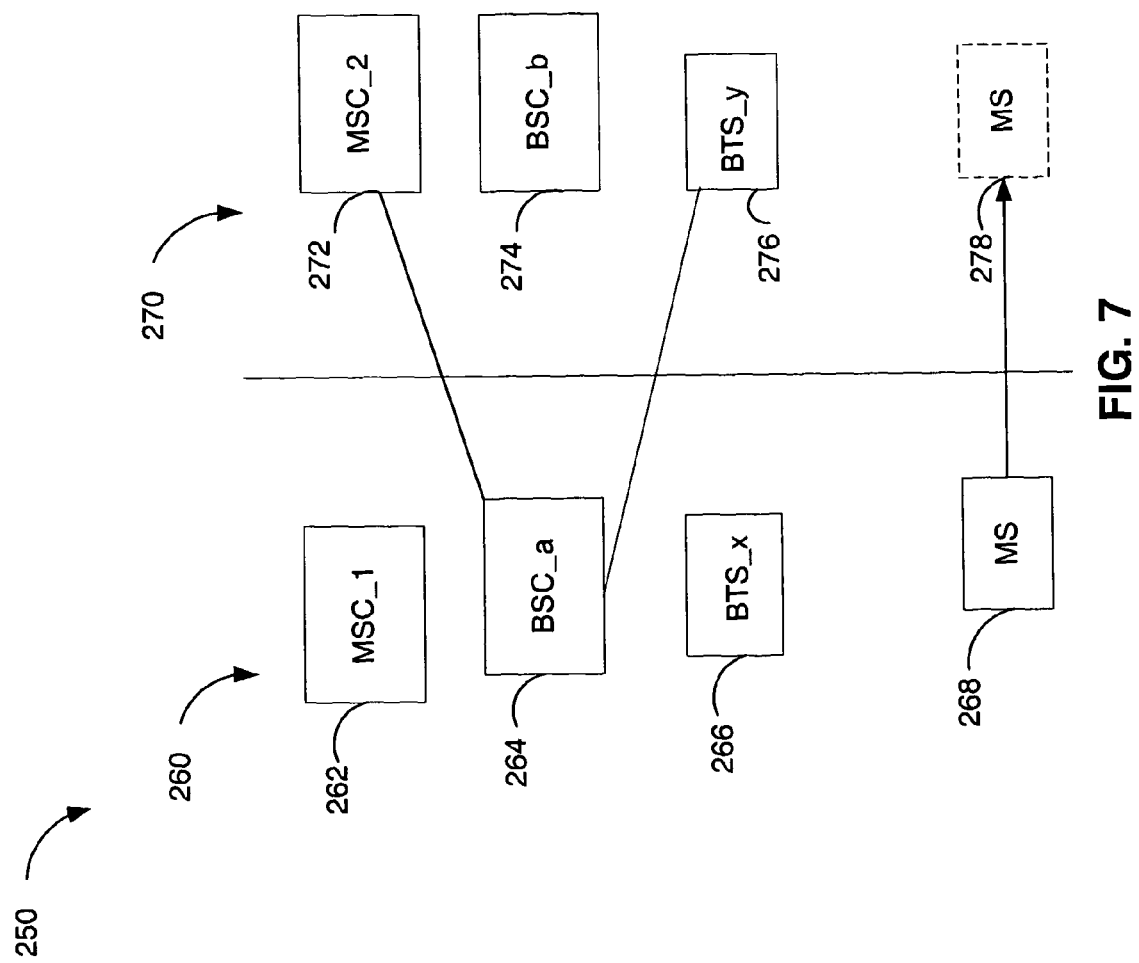
FIG. 7 is a diagram of voice call processing in a system supporting High Rate Packet Data (HRPD) communications.
Figure 8:
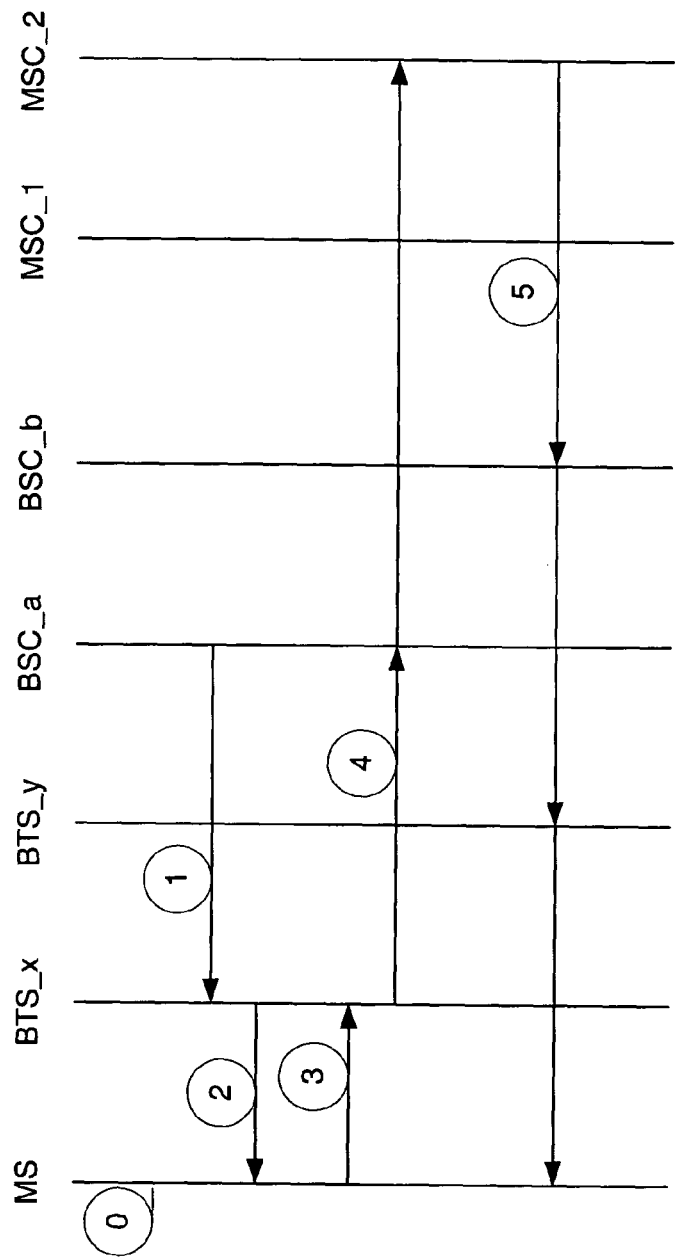
FIG. 8 is a diagram of voice call processing in a system supporting High Rate Packet Data (HRPD) communications employing a reflector.

Referring to FIGS. 7 and 8, specifically, when the MS 268 crosses a sub-net boundary, the new BTS is entered into an Active Set (AS) for communication. For example, as MS 268 moves into portion 270, the BTS_y 276 enters into the AS of MS 268. The BSC_a 264 (anchor base station) initiates the registration process for MS 268 to register with MSC_2 272. The BSC_a 264 determines that the MS 268 has entered the foot-print or geographic area of MSC_2 272 by examining the SecotrID (SID) of BTS_y 276. Note that to receive a notification from the MS 268 when the MS 268 moves to the foot-print of another MSC, the MSC boundaries are HRPD sub-net boundaries.

The BSC_a 264 sends a TunneledRegistrationRequest message to the MS 268 to force the MS 268 to register with the new MSC. In one embodiment, the message contains a 32-bit random number, RAND, which the MS 268 needs to generate the AUTHR.

The MS 268 processes this message as if it has received a "Registration Request Order" such as in IS-2000, and generates a TunneledRegistrationMessage. When performing the registration, the mobile must use the RAND given in the TunneledRegistrationRequest message as, RANDs, specified in IS-2000. The content of the TunneledRegistrationMessage is identical to a Registration message of IS-2000. The NUM_ADD_PILOTS field is set to zero in this message.

The BSC_a 264 uses the information given in the TunneledRegistrationMessage to construct a "Location Updating Request" (as specified in the IOS) and register the MS 268 with MSC_2 272. The BSC_a 264 determines to which MSC to send the "Location Updating Request" based on the MSBs of the BTS_y's SectorID and an internal mapping table or by using the bits in the SectorID of BTS_y directly. The communication paths are illustrated in FIG. 7.

After the registration is performed, the PSTN pages will be delivered to MSC_2 272, BSC_a 264, and then to the MS 268 on the HRPD FTC. The mobile then tunes to the circuit-switched frequency, such as IS-2000, and responds to the page. FIG. 8 provides a signal flow diagram consistent therewith.

Figure 9:
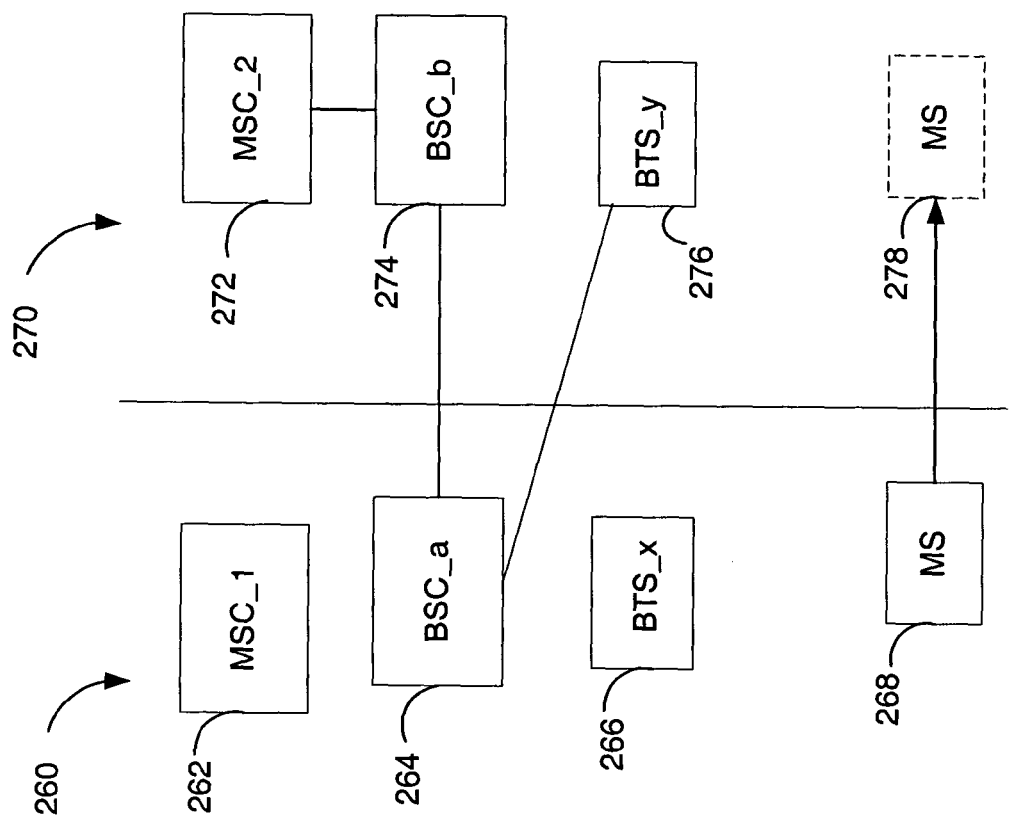
FIG. 9 is a diagram illustrating movement of a Mobile Station (MS) within a cellular network supporting various protocols.
Figure 10:
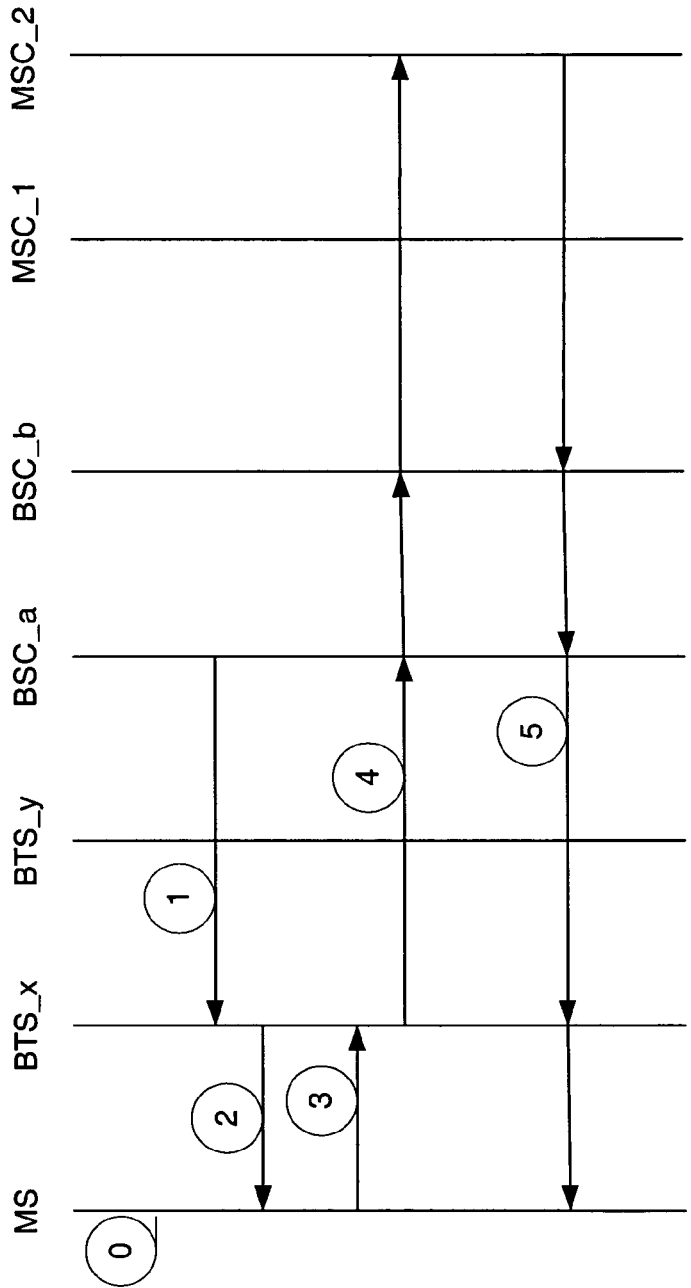
FIG. 10 is a call flow for movement of a MS in a cellular network supporting various protocols.

FIGS. 9 and 10 illustrate another scenario wherein BSC_a 264 initiates a registration process with the MS 268 via BTS_x 266, wherein a tunneled registration process is provided. The MS 268 sends a tunneled registration message via BTS_x 266 with location updating request continuing to BSC_a 264, BSC_b 274, MSC_1 262, and MSC_2 272. The MSC_2 272 then provides PSDN pages to the MS 268 via BSC_b 274, BSC_a 264, and BTS_x 266.

Figure 11:
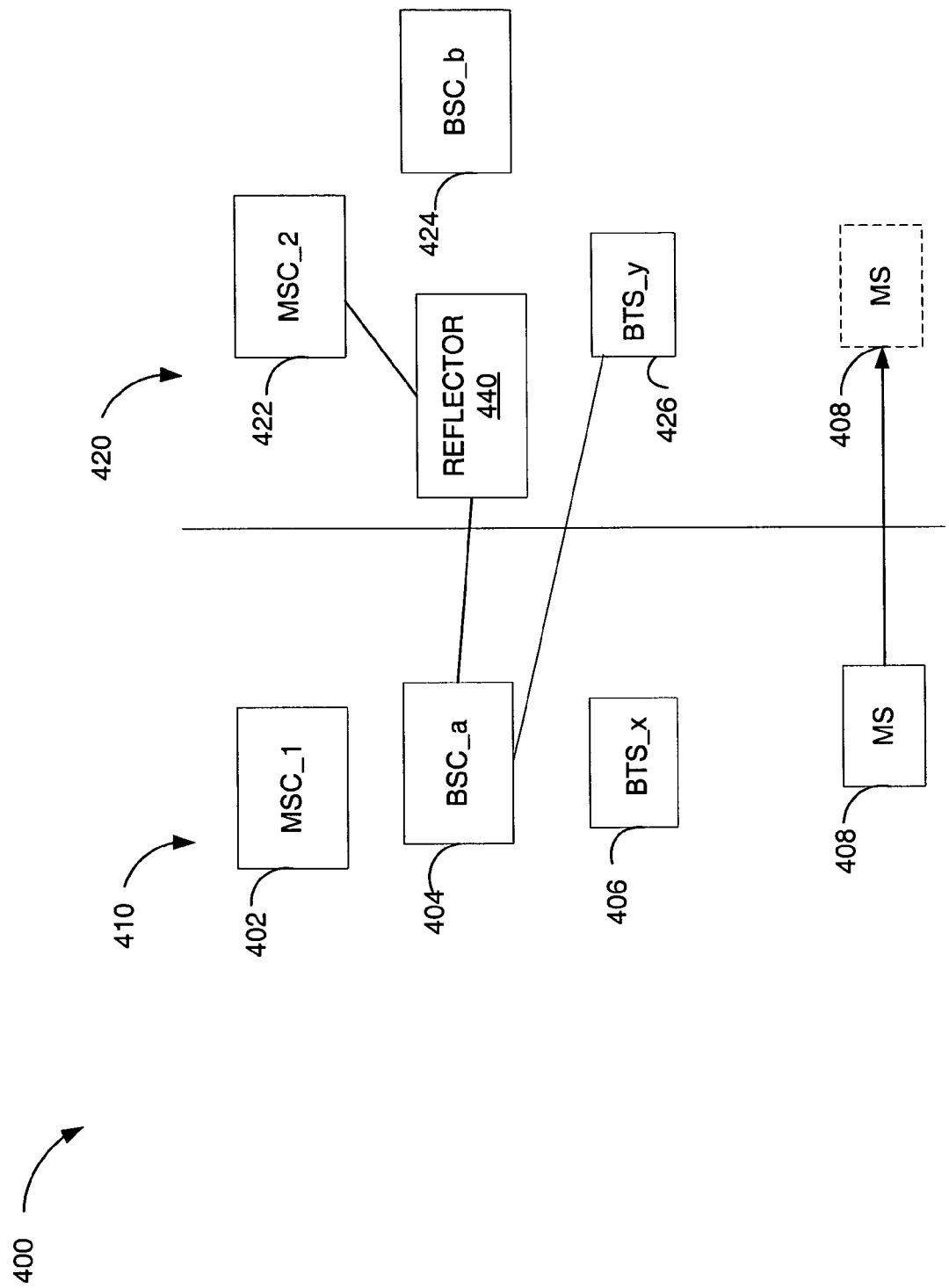
FIG. 11 is a diagram illustrating movement of a Mobile Station (MS) within a cellular network supporting various protocols.
Figure 12:
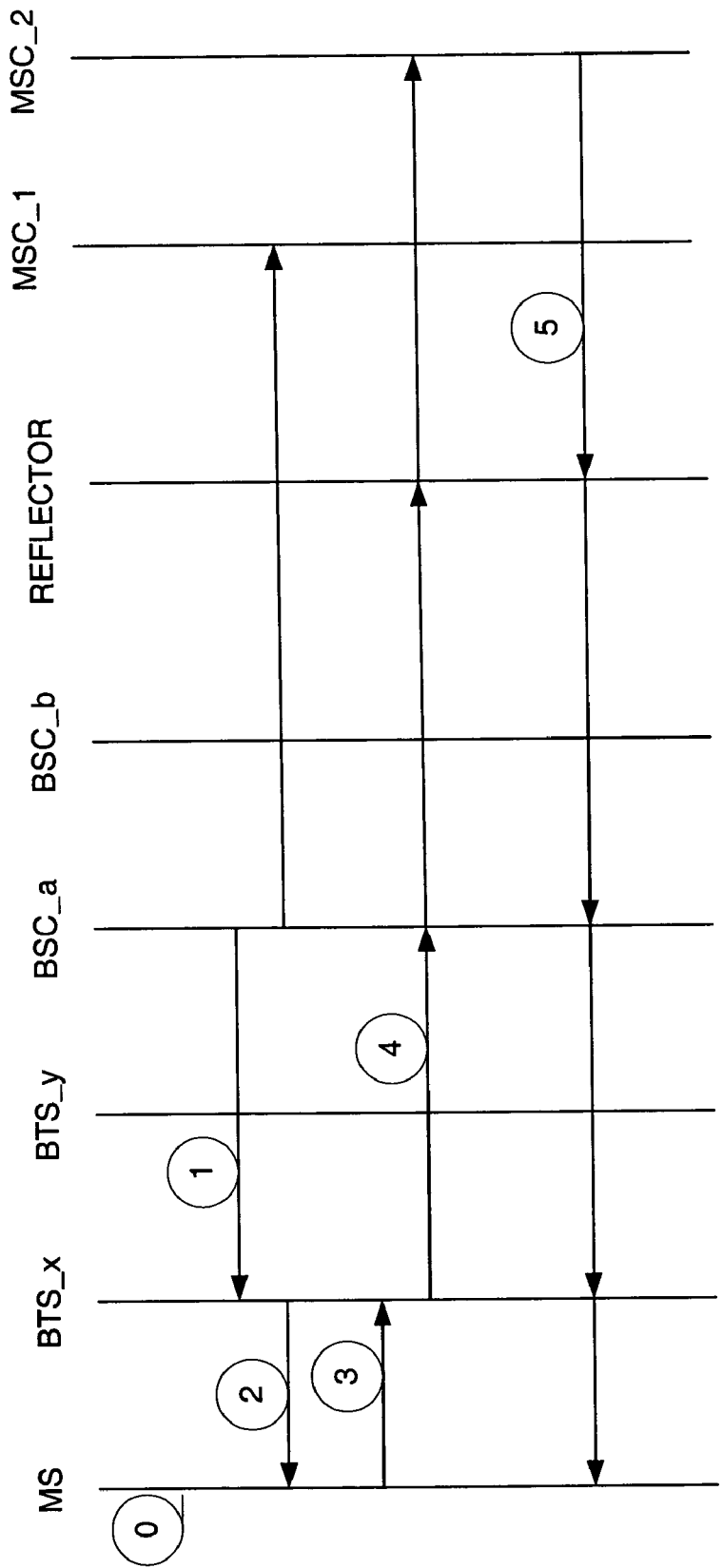
FIG. 12 is a call flow for movement of a MS in a cellular network supporting various protocols.

If the anchor BSC cannot reach the neighboring MSC directly, then the anchor BSC can forward the "A1: Location Updating Request" through a Reflector to the neighboring MSC as illustrated in FIGS. 11 and 12.

The Reflector 440 forwards the "A1 Location Updating Requests" from the anchor BSC to the MSC to which it is connected. The Reflector 440 forwards the "A1 Paging Requests" from the MSC to the anchor BSC. The Reflector 440 maintains the binding between the IMSI and the associated anchor BSC.

From the perspective of the MSC, the Reflector 440 appears as a BSC. Therefore, the A1 interface does not need to be modified in order to accommodate the cross-paging feature. In this scenario, the BSC_a 404 communicates with the Reflector 440 and not the MSC_2 422.

If the cell identifier is used to determine the BSC for delivery of pages, this may cause, for example, the MSC_2 422 to deliver the page to BSC_b 424, which is associated with BTS_y 426. In order to avoid such a problem, the Reflector 440 gives the Cell ID of a virtual cell that is bound to the Reflector 440 when it registers with the MSC_2 422. In this way the MSC_2 422 delivers the pages to the Reflector 440 (and not BSC_b 424) and the Reflector 440 passes the page to BSC_a 404.

According to another embodiment, the method copies the Radio Session for the mobile to BSC_b. The Radio Session includes information about the anchor BSC (i.e., BSC_a) and allows the BSC_b to forward "A1 Paging Request" to BSC_a. The "A1 Location updating Message" path is from BSC_a to BSC_b to MSC_2. The "A1: Paging Request Message" path is MSC_2 to BSC_b to BSC_a (which will then send the page to mobile through BTS_y). This alternative requires no change in the MSC or A1 interface.

One problem occurs when a mobile station switches to the frequency associated with a dormant packet data application and then the mobile station crosses a packet zone boundary. It is necessary to ensure the packet data application page is delivered to the mobile. One solution provides for the BSC to ensure that pages from the PDSN network are directed appropriately. For example, when a mobile station monitors the packet data frequency and moves across BSCs, the target BSC must ensure that the PDSN points to the right BSC at all times by retrieving the radio session from the source BSC.

The mobile station selects a Service Option (SO), wherein crossing boundaries is specified. For example, in a 1xEVDO type system, the SO ideally specifies steps to be taken when the mobile station crosses a packet zone boundary. Such steps would be similar to those specified in SO 33, i.e., the mobile station sends an origination message with an indication that the mobile station has crossed a boundary. The mobile station sends a UATI to the target BSC. Note this may require a specific message sent on the packet data frequency.

According to one embodiment, while the mobile station is monitoring only the circuit-switched air-interface, the Radio Access Network (RAN) sends the mobile station a page specifying SO 59 when a packet destined for the mobile station arrives on the packet-switched network. Push services may be served by the packet data air-interface. After switching to the circuit-switched air-interface, the mobile station may monitor the circuit-switched frequency exclusively.

Due to the nature of the packet-switched services, the mobile station may become active after being idle for a short period of time. Therefore, in order to avoid tuning back-and-forth between two air-interfaces too quickly, the mobile stays tuned to the packet data air-interface for 'T' seconds before it tunes to the circuit-switched air-interface. 'T' will be a configurable attribute of the Hybrid Protocol.

From the network side, the target BSC will retrieve the radio session from the source BSC and establish an R-P interface with the PDSN. As presented in one embodiment, "1x:" denotes a message sent using the 1x air-interface and frequency; and "SO 59" denotes messages defined by SO 59. In this embodiment, the mobile station selects SO 59, which is a service option identifying a high rate packet data service over a 1x network. The base station will page a mobile station and include the SO 59 identifier to notify the mobile station of a pending high data rate communication.

Figure 13:
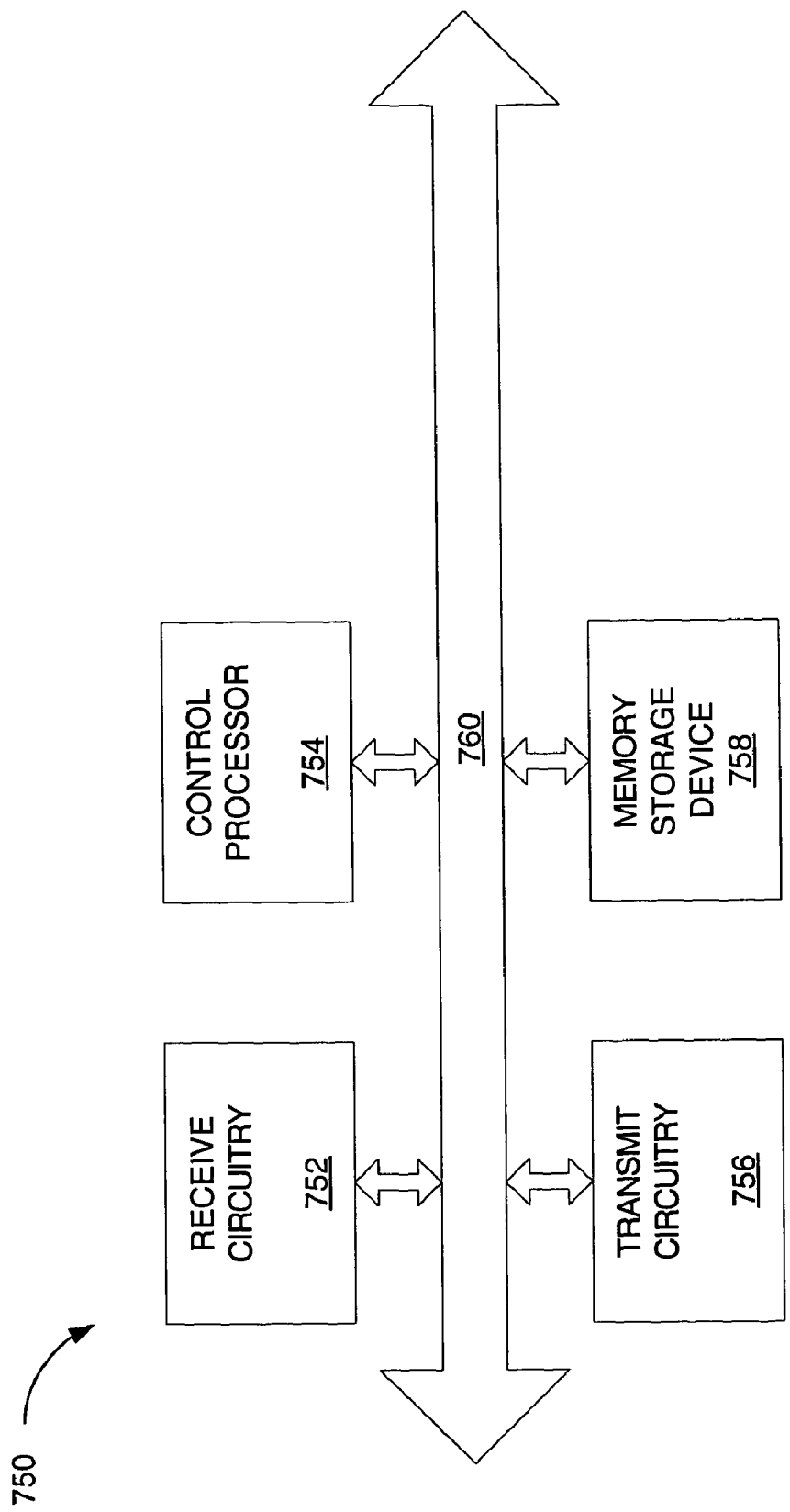
FIG. 13 is a block diagram of an Access Terminal (AT)

FIG. 13 illustrates an Access Terminal (AT) 750 supporting one or more of the hybrid protocol methods detailed hereinabove. The AT 750 includes a communication bus 760 coupling receive circuitry 752, control processor 754, transmit circuitry 756, and a memory storage device 758. Computer-readable instructions for implementing a hybrid protocol method are stored in memory storage device 758.

Figure 14:
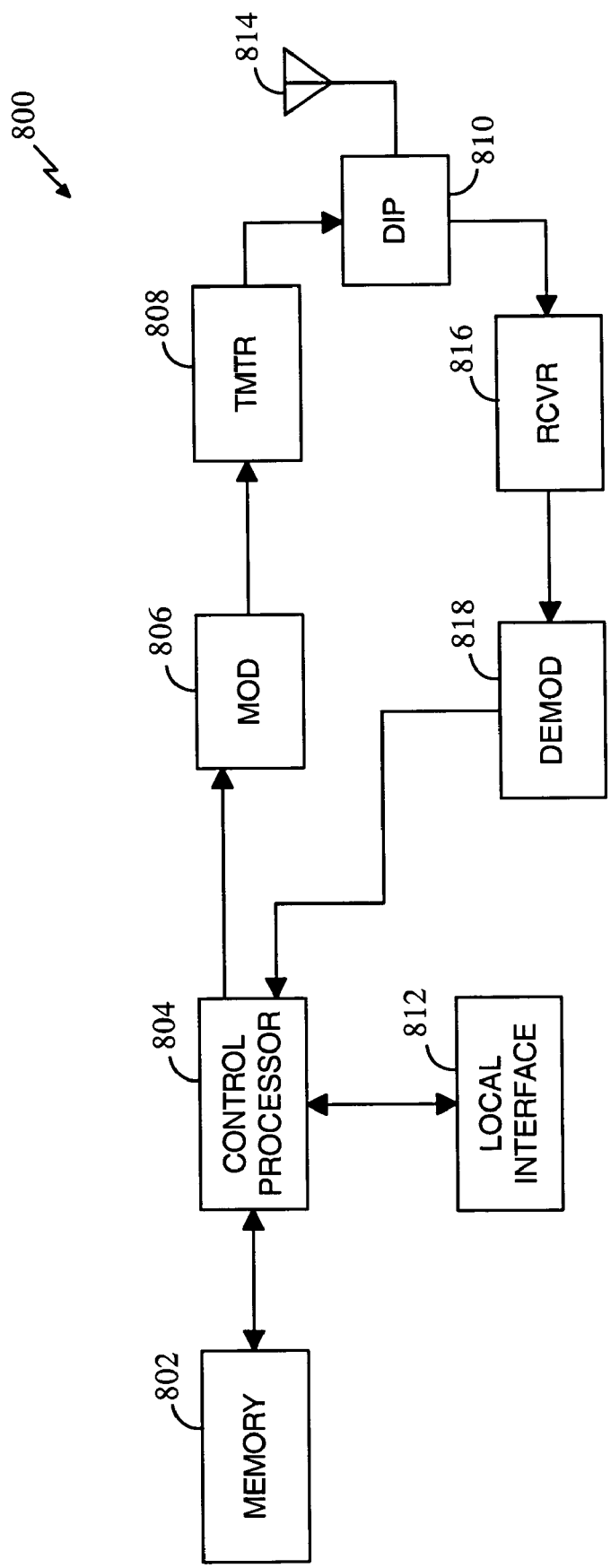
FIG. 14 is a block diagram of an Access Network (AN) element.

FIG. 14 illustrates an Access Network (AN) 800 supporting one or more of the hybrid protocol methods detailed hereinabove. AN 800 includes an antenna 814 coupled to a transmit path and a receive path. The antenna 814 may represent a common antenna or may be a grouping of antennas. In the receive path, signals are routed through receiver (RCVR) 816 and demodulator (DEMOD) 818, which is coupled to control processor 804. Control processor 804 is further coupled to local interface 812, and memory 802. On the transmit path, the control processor 804 is coupled to modulator (MOD) 806 and transmitter (TMTR) 808. Computer-readable instructions for implementing a hybrid protocol method are stored in memory storage device 802.

Figure 15:
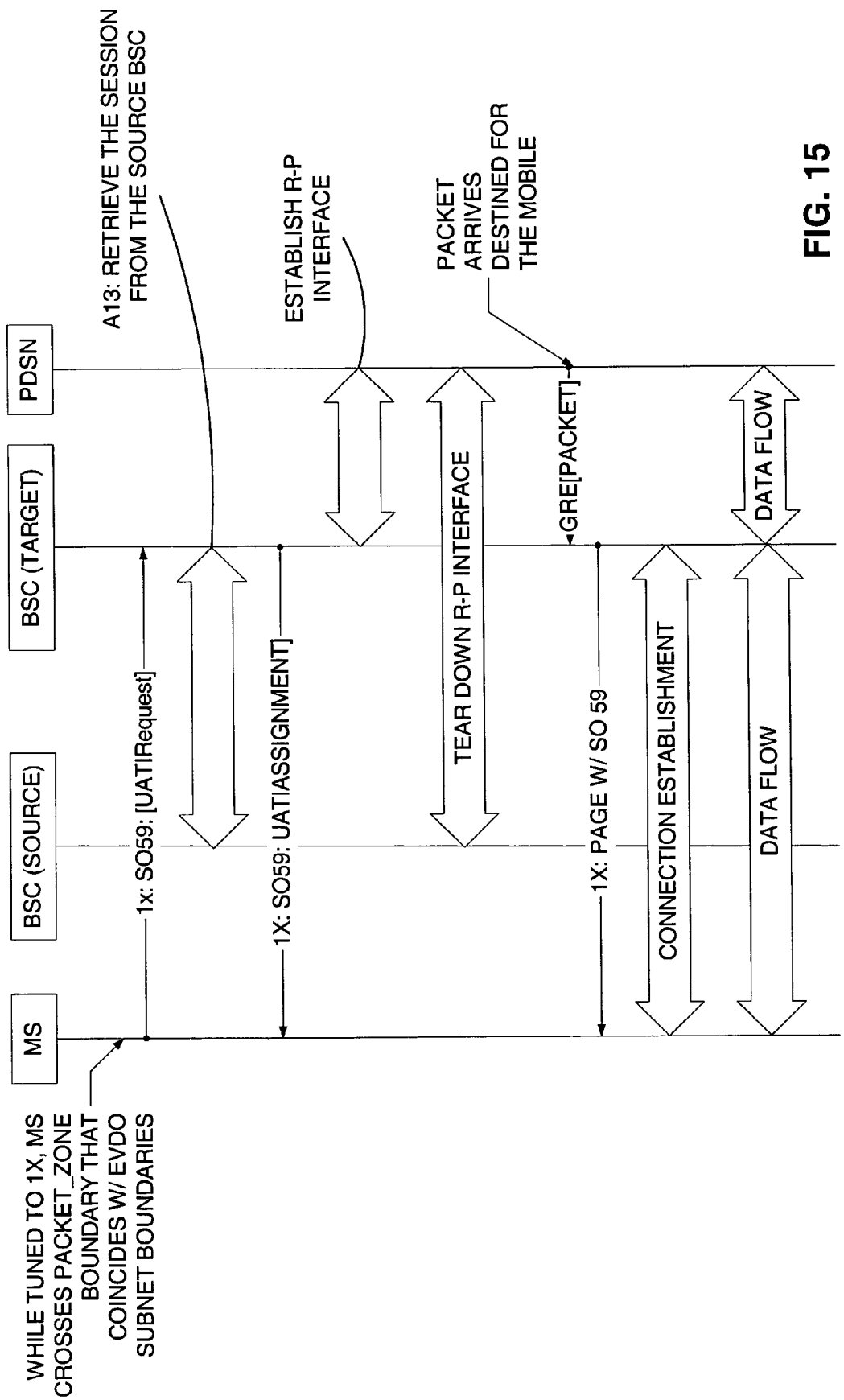
FIG. 15 is a call flow according to one embodiment.

FIG. 15 illustrates call flow according to one scenario. In this scenario, the target BSC retrieves the session information from the source BSC on a mobile station crossing a boundary. The PDSN establishes an interface with the target BSC. The interface with the source BSC is then torn down in favor of the target BSC. When a data packet page arrives for the mobile station, a connection is established with the target BSC and data flows to the mobile station through the target BSC.

The embodiments described herein allow push services to be served by the AN, in a system supporting both circuit-switched and packet-switched transmissions. The mobile station periodically monitors the packet data network for data packet pages. Monitoring two air-interfaces periodically in the slotted mode reduces the standby time. According to one embodiment, the mobile station monitors both systems until the packet-switched network is idle for a threshold time period T. At this time, the mobile station only monitors the circuit-switched network. The service option will then identify while type of page is received, either for a circuit-switched communication or a packet-switched communication. When the mobile station receives a notification of a packet data page, the mobile station will then monitor the packet data frequency. Again, once an idle time period passes a threshold, the mobile station begins to monitor only the circuit-switched network.

While the mobile station is monitoring the 1x air-interface only, the RAN sends the mobile a page with a specific service option, such as SO 59, on receipt of a packet destined for the mobile arrives on the packet-switched network. In this scenario, push services may be served by the packet-switched network. After switching to the circuit-switched air-interface, the mobile station may monitor the associated frequency exclusively.

Due to the nature of the packet-switched services, it is likely that the mobile station will become active after being idle for a short period of time. Therefore, in order to avoid tuning back-and-forth between two air-interfaces too quickly, the mobile station stays tuned to the packet data air-interface for 'T' seconds before it tunes to the circuit-switched air-interface. 'T' may be a configurable attribute of the Hybrid Protocol.

While monitoring the packet data air-interface only (e.g., when in the connected state or before the mobile station tunes back to the circuit-switched interface and camps there), notifications for the circuit-switched services are sent through the packet data air-interface.

The mobile station would not necessarily be required to periodically switch between monitoring the packet data frequency and circuit-switched frequency due to the delivery of notification to the mobile station, which is received independent of the air-interface that the mobile station is currently monitoring.

The Hybrid Protocol according to one embodiment provides a new air-interface protocol which allows the transmission of notifications for the circuit-switched services (e.g., voice pages) through the packet data air-interface. Such Hybrid Protocol allows the mobile station to configure a filtering mechanism such that only certain types of pages associated with circuit-switched services are sent through the packet data air-interface. For example, the mobile may request to receive only those notifications for voice and not for Short Messaging Service (SMS) while tuned to the packet data interface.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the subscriber station, or elsewhere. In the alternative, the processor and the storage medium may reside as discrete components in the subscriber station, or elsewhere in an access network.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of wireless communications by a wireless communication device, comprising:
    monitoring a first network in accordance with a first air interface on a first carrier frequency;
    configuring a filtering mechanism to allow for one or more message format types associated with messages from a second network to be communicated through the first air interface, the second network being associated with a second air interface different from the first air interface and operating on a second carrier frequency different from the first carrier frequency;
    receiving a message from the second network through the first air interface, if a message format type of the message is one of the one or more message format types configured to be allowed to be communicated through the first air interface;
    wherein the first network comprises a circuit-switched network and the second network comprises a packet-switched network; and
    wherein the second network comprises first and second geographic regions, the method further comprising detecting movement of the wireless communication device into the second geographic region from the first geographic region while monitoring the first network, and sending a request for an identifier to an access network in the second geographic region to support communications with the second network, the request being sent through the first air interface.

2. The method of claim 1, further comprising maintaining a dormant connection with the second network while monitoring the first network.

3. The method of claim 1 wherein the one or more message format types comprises one or more types of pages, wherein the message from the second network comprises a page from the second network, the method further comprising communicating with the second network in response to the page in accordance with the second air interface.

4. The method of claim 3 further comprising receiving a message from the first network when communicating with the second network, the message from the first network being sent through the second air interface.

5. The method of claim 4 wherein the message from the first network comprises a first network page, the method further comprising terminating communications with the second network in response to the first network page, and communicating with the first network in accordance with the first air interface in response to the first network page.

6. The method of claim 1, further comprising staying registered with the circuit-switched network upon detection of movement of the wireless communication device from the first geographic region to the second geographic region.

7. A method of wireless communications by a wireless communication device, comprising:
    monitoring a first network in accordance with a first air interface on a first carrier frequency;
    configuring a filtering mechanism to allow for one or more message format types associated with messages from a second network to be communicated through the first air interface, the second network being associated with a second air interface different from the first air interface and operating on a second carrier frequency different from the first carrier frequency;
    receiving a message from the second network through the first air interface, if a message format type of the message is one of the one or more message format types configured to be allowed to be communicated through the first air interface;
    wherein the first network comprises a circuit-switched network and the second network comprises a packet-switched network; and
    wherein the first network comprises first and second geographic regions, the method further comprising detecting movement of the wireless communication device into the second geographic region from the first geographic region while monitoring the second network, and sending a registration request to an access network in the second geographic region to support communications with the first network, the registration request being sent through the second air interface.

8. The method of claim 7, further comprising maintaining a dormant connection with the second network while monitoring the first network.

9. The method of claim 7, wherein the one or more message format types comprises one or more types of pages, wherein the message from the second network comprises a page from the second network, the method further comprising communicating with the second network in response to the page in accordance with the second air interface.

10. The method of claim 9, further comprising receiving a message from the first network when communicating with the second network, the message from the first network being sent through the second air interface.

11. The method of claim 10, wherein the message from the first network comprises a first network page, the method further comprising terminating communications with the second network in response to the first network page, and communicating with the first network in accordance with the first air interface in response to the first network page.

12. The method of claim 7, further comprising staying registered with the circuit-switched network upon detection of movement the wireless communication device from the first geographic region to the second geographic region.

13. A wireless communications device, comprising:
an analog circuit configured to recover information from a signal received in accordance with a first air interface on a first carrier frequency, the first air interface, being associated with a first network;
a filtering mechanism configured to allow one or more message format types associated with messages from a second network to be communicated through the first air interface, the second network being associated with a second air interface different from the first air interface and operating on a second carrier frequency different from the first carrier frequency; and
a processor configured to detect from the recovered information a message from the second network, if the filtering mechanism is configured to allow a message format type of the message to be communicated through the first air interface;
wherein the second network comprises first and second geographic regions, and wherein the processor is further configured to detect movement of the wireless communications device into the second geographic region from the first geographic region while the analog circuit is configured to recover information from the signal received in accordance with the first air interface, and wherein the processor is further configured to request an identifier from an access network in the second geographic region to support communications with the second network, the identifier request being sent through the first air interface.

14. The wireless communications device of claim 13, wherein the processor is further configured to maintain a dormant connection with the second network while the analog circuit is configured to recover the information from the signal received in accordance with the first air interface.

15. The wireless communications device of claim 13 wherein the one or more message format types comprises one or more types of pages, wherein the message from the second network comprises a page from the second network, the analog circuit being further configured to recover information from a second signal received in accordance with the second air interface in response to the page.

16. The wireless communications device of claim 15 wherein the processor is further configured to detect from the information recovered from the second signal a message from the first network.

17. The wireless communications device of claim 16 wherein the message from the first network comprises a first network page, and wherein the analog circuit is further configured to recover further information from the signal received in accordance with the first air interface in response to the first network page.

18. The wireless communications device of claim 13, wherein the processor is further configured to stay registered with the circuit-switched network when movement of the wireless communications device from the first geographic region to the second geographic region is detected.

19. A wireless communications device comprising:
an analog circuit configured to recover information from a signal received in accordance with a first air interface on a first carrier frequency, the first air interface being associated with a first network;
a filtering mechanism configured to allow one or more message format types associated with messages from a second network to be communicated through the first air interface, the second network being associated with a second air interface different from the first air interface and operating on a second carrier frequency different from the first carrier frequency;
a processor configured to detect from the recovered information a message from the second network, if the filtering mechanism is configured to allow a message format type of the message to be communicated through the first air interface; and
wherein the first network comprises first and second geographic regions, and wherein the processor is further configured to detect movement of the wireless communications device into the second geographic region from the first geographic region while the analog circuit is configured to recover information from the signal received in accordance with the first air interface, and wherein the processor is further configured to send a registration request to an access network in the second geographic region to support communications with the first network, the registration request being sent through the second air interface.

20. The wireless communications device of claim 19, wherein the processor is further configured to maintain a dormant connection with the second network while the analog circuit is configured to recover the information from the signal received in accordance with the first air interface.

21. The wireless communications device of claim 19, wherein the one or more message format types comprises one or more types of pages, wherein the message from the second network comprises a page from the second network, the analog circuit being further configured to recover information from a second signal received in accordance with the second air interface in response to the page.

22. The wireless communications device of claim 21, wherein the processor is further configured to detect from the information recovered from the second signal a message from the first network.

23. The wireless communications device of claim 22, wherein the message from the first network comprises a first network page, and wherein the analog circuit is further configured to recover further information from the signal received in accordance with the first air interface in response to the first network page.

24. The wireless communications device of claim 19, wherein the processor is further configured to stay registered with the circuit-switched network when movement of the wireless communications device is detected from the first geographic region to the second geographic region.

25. A wireless communications device, comprising:
means for recovering information from a signal received in accordance with a first air interface on a first carrier frequency, the first air interface being associated with a first network;
means for allowing one or more message format types associated with messages from a second network to be communicated through the first air interface, the second network being associated with a second air interface different from the first air interface and operating on a second carrier frequency different from the first carrier frequency;

means for detecting from the recovered information a message from the second network, if the means for allowing is configured to allow a message format type of the message to be communicated through the first air interface;

wherein the second network comprises first and second geographic regions, and wherein the means for detecting is further configured to detect movement of the wireless communications device into the second geographic region from the first geographic region while the means for recovering is configured to recover information from the signal received in accordance with the first air interface, and wherein the means for detecting is further configured to request an identifier from an access network in the second geographic region to support communications with the second network, the identifier request being sent through the first air interface.

26. The wireless communications device of claim 25 wherein the one or more message format types comprises one or more types of pages, wherein the message from the second network comprises a page from the second network, the wireless communications device further comprising means for communicating with the second network in response to the page in accordance with the second air interface.

27. The wireless communications device of claim 26 further comprising means for receiving a message from the first network when communicating with the second network, the message being sent through the second air interface.

28. The wireless communications device of claim 27 wherein the message from the first network comprises a first network page, the wireless communications device further comprising means for terminating communication with the second network in response to the first network page, and means for further communicating with the first network in accordance with the first air interface in response to the first network page.

29. A computer-program product comprising a computer readable medium having instructions thereon, the instructions comprising:

code for monitoring a first network in accordance with a first air interface on a first carrier frequency;

code for configuring a filtering mechanism to allow for one or more message format types associated with messages from a second network to be communicated through the first air interface, the second network being associated with a second air interface different from the first air interface and operating on a second carrier frequency different from the first carrier frequency; and code for receiving a message from the second network through the first air interface, if a message format type of the message is one of the one or more message format types configured to be allowed to be communicated through the first air interface;

wherein the first network comprises a circuit-switched network and the second network comprises a packet-switched network; and wherein the second network comprises first and second geographic regions, the computer program product further comprising code for monitoring the first network while detecting movement of a wireless communication device into the second geographic region from the first geographic region, and code for sending a request for an identifier to an access network in the second geographic region to support communications with the second network, the request being sent through the first air interface.

30. The computer-program product of claim 29, wherein the code for configuring further comprises configuring to allow one or more message format types comprising one or more types of pages, and wherein the code for receiving further comprises receiving if the message format type comprises a type of page configured to be allowed to be communicated through the first air interface.

31. A method of wireless communications, comprising:

receiving, at a second controller of a second wireless communications region, a request to support packet communications from a mobile station through a first air interface for circuit switched communications, wherein the request comprises a first unique address identifier of the mobile station corresponding to an established session for a dormant packet switched connection in a first wireless communications region assigned by a first controller of the first wireless communications region;

retrieving, by the second controller from the first controller, session information corresponding to the session for the dormant packet switched connection of the mobile station based on the first unique address identifier;

establishing a new packet switched connection for the mobile station in the second region based on the retrieved session information to maintain the session in the second region, wherein the new packet switched connection comprises a new unique address identifier for the second region; and sending the new unique address identifier for the second region to the mobile station via the first air interface for circuit switched communications.

32. The method of claim 31, wherein receiving the request from the mobile station is based on detection of the mobile station crossing a sub-network boundary between the first wireless communications region and the second wireless communications region.

33. The method of claim 31, wherein receiving the request from the mobile station is based on the mobile station adding a target base station from the second wireless communications region to an active set of base stations.

34. The method of claim 31, wherein receiving the request from the mobile station corresponds to a handoff of the mobile station from a source base station in the first wireless communications region to a target base station in the second wireless communications region.

35. The method of claim 31, further comprising releasing the dormant packet switched connection after establishing the new packet switched connection.

36. The method of claim 31, further comprising transmitting a page to the mobile station via the first air interface for circuit switched communications, wherein the page corresponds to the session and causes the mobile station to tune from a first frequency of the first air interface for circuit switched communications to a second frequency of a second interface for packet switched communications.

37. A module for wireless communications, the module residing in a storage medium, comprising:

information executable by a processor for receiving, at a second controller of a second wireless communications region, a request to support packet communications from a mobile station through a first air interface for circuit switched communications, wherein the request comprises a first unique address identifier of the mobile station corresponding to an established session for a dormant packet switched connection in a first wireless communications region assigned by a first controller of the first wireless communications region;

information executable by the processor for retrieving, by the second controller from the first controller, session information corresponding to the session for the dormant packet switched connection of the mobile station based on the first unique address identifier;

information executable by the processor for establishing a new packet switched connection for the mobile station in the second region based on the retrieved session information to maintain the session in the second region, wherein the new packet switched connection comprises a new unique address identifier for the second region; and information executable by the processor for sending the new unique address identifier for the second region to the mobile station via the first air interface for circuit switched communications.

38. The module of claim 37, wherein the information for receiving the request from the mobile station is based on the mobile station crossing a sub-network boundary between the first wireless communications region and the second wireless communications region.

39. An apparatus for wireless communications, comprising:

means for receiving, at a second controller of a second wireless communications region, a request to support packet communications from a mobile station through a first air interface for circuit switched communications, wherein the request comprises a first unique address identifier of the mobile station corresponding to an established session for a dormant packet switched connection in a first wireless communications region assigned by a first controller of the first wireless communications region;

means for retrieving, by the second controller from the first controller, session information corresponding to the session for the dormant packet switched connection of the mobile station based on the first unique address identifier;

means for establishing a new packet switched connection for the mobile station in the second region based on the retrieved session information to maintain the session in the second region, wherein the new packet switched connection comprises a new unique address identifier for the second region; and means for sending the new unique address identifier for the second region to the mobile station via the first air interface for circuit switched communications.

40. The apparatus of claim 39, wherein the means for receiving the request from the mobile station further comprises means for receiving based on detection of the mobile station crossing a sub-network boundary between the first wireless communications region and the second wireless communications region.

41. The apparatus of claim 39, wherein the request from the mobile station is based on the mobile station adding a target base station from the second wireless communications region to an active set of base stations.

42. An apparatus for wireless communications, comprising:

a memory comprising computer-readable instructions for:
receiving, at a second controller of a second wireless communications region, a request to support packet communications from a mobile station through a first air interface for circuit switched communications, wherein the request comprises a first unique address identifier of the mobile station corresponding to an established session for a dormant packet switched connection in a first wireless communications region assigned by a first controller of the first wireless communications region;

retrieving, by the second controller from the first controller, session information corresponding to the session for the dormant packet switched connection of the mobile station based on the first unique address identifier;

establishing a new packet switched connection for the mobile station in the second region based on the retrieved session information to maintain the session in the second region, wherein the new packet switched connection comprises a new unique address identifier for the second region; and sending the new unique address identifier for the second region to the mobile station via the first air interface for circuit switched communications; and a processor coupled to the memory and configured to execute the computer-readable instructions.

43. The apparatus of claim 42, wherein the request from the mobile station is based on detection of the mobile station crossing a sub-network boundary between the first wireless communications region and the second wireless communications region.

44. The apparatus of claim 42, wherein the request from the mobile station corresponds to a handoff of the mobile station from a source base station in the first wireless communications region to a target base station in the second wireless communications region.

45. The apparatus of claim 42, further comprising computer-readable instructions for releasing the dormant packet switched connection after establishing the new packet switched connection.

46. The apparatus of claim 42, further comprising computer-readable instructions for transmitting a page to the mobile station via the first air interface for circuit switched communications, wherein the page corresponds to the session and causes the mobile station to tune from a first frequency of the first air interface for circuit switched communications to a second frequency of a second interface for packet switched communications.

47. A method of wireless communications, comprising:

establishing, by a mobile station, a session for a first packet switched connection in a first wireless communications region assigned by a first controller of the first wireless communications region;

receiving, by the mobile station from the first controller, a first unique address identifier of the mobile station for the first packet switched connection;

establishing, by the mobile station, a first air interface for circuit switched communications in the first wireless communications region;

transmitting a request to support packet communications from the mobile station to a second controller of the second wireless communications region through the first air interface for circuit switched communications, wherein the request comprises the first unique address identifier, wherein the request is based on detection of movement of the mobile station from the first wireless communications region to a second wireless communications region while the first packet switched connection is in a dormant state; and receiving, from the second controller, a new unique address identifier of the mobile station for the second region via the first air interface for circuit switched communications, wherein the new unique address identifier corresponds to a new packet switched connection in the second region to maintain the session for the mobile station, wherein the new packet switched connection is established by the second controller based on session information retrieved from the first controller according to the first unique address identifier, wherein the session information corresponds to the session for the dormant packet switched connection of the mobile station.

48. The method of claim 47, wherein transmitting the request is further based on detection of the mobile station crossing a sub-network boundary between the first wireless communications region and the second wireless communications region.

49. The method of claim 47, wherein transmitting the request is further based on the mobile station adding a target base station from the second wireless communications region to an active set of base stations.

50. The method of claim 47, wherein transmitting the request corresponds to a handoff of the mobile station from a source base station in the first wireless communications region to a target base station in the second wireless communications region.

51. The method of claim 47, further comprising releasing the dormant packet switched connection after establishing the new packet switched connection.

52. The method of claim 47, further comprising receiving a page at the mobile station via the first air interface for circuit switched communications, wherein the page corresponds to the session and causes the mobile station to tune from a first frequency of the first air interface for circuit switched communications to a second frequency of a second interface for packet switched communications.

53. A module for wireless communications, the module residing in a storage medium, comprising:
   information executable by a processor at a mobile station for establishing a session for a first packet switched connection in a first wireless communications region assigned by a first controller of the first wireless communications region;
   information executable by the processor for receiving, from the first controller, a first unique address identifier of the mobile station for the first packet switched connection;
   information executable by the processor for establishing a first air interface for circuit switched communications in the first wireless communications region;
   information executable by the processor for transmitting a request to support packet communications from the mobile station to a second controller of the second wireless communications region through the first air interface for circuit switched communications, wherein the request comprises the first unique address identifier, wherein the request is based on detection of movement of the mobile station from the first wireless communications region to a second wireless communications region while the first packet switched connection is in a dormant state; and
   information executable by the processor for receiving, from the second controller, a new unique address identifier of the mobile station for the second region via the first air interface for circuit switched communications, wherein the new unique address identifier corresponds to a new packet switched connection in the second region to maintain the session for the mobile station, wherein the new packet switched connection is established by the second controller based on session information retrieved from the first controller according to the first unique address identifier, wherein the session information corresponds to the session for the dormant packet switched connection of the mobile station.

54. The module of claim 53, wherein the information for transmitting the request from the mobile station is based on the mobile station crossing a sub-network boundary between the first wireless communications region and the second wireless communications region.

55. A mobile station for wireless communications, comprising:
   means for establishing a session for a first packet switched connection in a first wireless communications region assigned by a first controller of the first wireless communications region;
   means for receiving, from the first controller, a first unique address identifier of the mobile station for the first packet switched connection;
   means for establishing a first air interface for circuit switched communications in the first wireless communications region;
   means for transmitting a request to support packet communications from the mobile station to a second controller of the second wireless communications region through the first air interface for circuit switched communications, wherein the request comprises the first unique address identifier, wherein the request is based on detection of movement of the mobile station from the first wireless communications region to a second wireless communications region while the first packet switched connection is in a dormant state; and
   means for receiving, from the second controller, a new unique address identifier of the mobile station for the second region via the first air interface for circuit switched communications, wherein the new unique address identifier corresponds to a new packet switched connection in the second region to maintain the session for the mobile station, wherein the new packet switched connection is established by the second controller based on session information retrieved from the first controller according to the first unique address identifier, wherein the session information corresponds to the session for the dormant packet switched connection of the mobile station.

56. The mobile station of claim 55, wherein the means for transmitting the request from the mobile station is based on detection of the mobile station crossing a sub-network boundary between the first wireless communications region and the second wireless communications region.

57. A mobile station for wireless communications, comprising:
   a memory comprising computer-readable instructions for:
      establishing a session for a first packet switched connection in a first wireless communications region assigned by a first controller of the first wireless communications region;
      receiving, from the first controller, a first unique address identifier of the mobile station for the first packet switched connection;
      establishing a first air interface for circuit switched communications in the first wireless communications region;
      transmitting a request to support packet communications from the mobile station to a second controller of the second wireless communications region through the first air interface for circuit switched communications, wherein the request comprises the first unique address identifier, wherein the request is based on detection of movement of the mobile station from the first wireless communications region to a second wireless communications region while the first packet switched connection is in a dormant state; and receiving, from the second controller, a new unique address identifier of the mobile station for the second region via the first air interface for circuit switched communications, wherein the new unique address identifier corresponds to a new packet switched connection in the second region to maintain the session for the mobile station, wherein the new packet switched connection is established by the second controller based on session information retrieved from the first controller according to the first unique address identifier, wherein the session information corresponds to the session for the dormant packet switched connection of the mobile station; and a processor coupled to the memory and configured to execute the computer-readable instructions.

58. The mobile station of claim 57, wherein the request is further based on detection of the mobile station crossing a sub-network boundary between the first wireless communications region and the second wireless communications region.

59. The mobile station of claim 57, wherein the request is further based on the mobile station adding a target base station from the second wireless communications region to an active set of base stations.

60. The mobile station of claim 57, wherein the request corresponds to a handoff of the mobile station from a source base station in the first wireless communications region to a target base station in the second wireless communications region.

61. The mobile station of claim 57, wherein the memory further comprises computer-readable instructions for releasing the dormant packet switched connection after establishing the new packet switched connection.

62. The mobile station of claim 57, further comprising a receiver for receiving a page via the first air interface for circuit switched communications, wherein the page corresponds to the session and causes the mobile station to tune from a first frequency of the first air interface for circuit switched communications to a second frequency of a second interface for packet switched communications.

63. A method of wireless communications, comprising:
determining, by a serving controller of an interface with a packet data serving node, that a mobile station having an active packet switched connection and an established circuit switched connection has moved from a first wireless communications region to a second wireless communications region;

transmitting a request to register for circuit switched communications to the mobile station via a first air interface for the packet switched connection based on determining that the mobile station has moved to the second wireless communications region;

receiving a registration message over the first air interface from the mobile station via a target base station in response to the mobile station receiving the request, wherein the target base station comprises an identifier; and transmitting a location update request to a target gateway to the circuit switched network determined based on the target base station identifier to maintain the circuit switched connection in the second wireless communications region.

64. The method of claim 63, wherein transmitting the location update request further comprises transmitting via a reflector element connectable with the target gateway if the target gateway cannot be directly reached.

65. The method of claim 64, further comprising:
appending, by the reflector element, a cellular identifier to the location update request, wherein the cellular identifier is bound to the reflector element;
receiving, by the target gateway, a circuit switched network page for the mobile station; and
forwarding the page to the serving controller via the reflector element according to the cellular identifier.

66. The method of claim 63, wherein transmitting the request to register further comprises including an authentication mechanism, wherein receiving the registration message further comprises an identification mechanism using the authentication mechanism, and further comprising verifying an identity of the mobile station based on the identification mechanism and the authentication mechanism before transmitting the location update request.

67. A module for wireless communications, the module residing in a storage medium, comprising:
information executable by a processor for determining, by a serving controller of an interface with a packet data serving node, that a mobile station having an active packet switched connection and an established circuit switched connection has moved from a first wireless communications region to a second wireless communications region;

information executable by the processor for transmitting a request to register for circuit switched communications to the mobile station via a first air interface for the packet switched connection based on determining that the mobile station has moved to the second wireless communications region;

information executable by the processor for receiving a registration message over the first air interface from the mobile station via a target base station in response to the mobile station receiving the request, wherein the target base station comprises an identifier; and information executable by the processor for transmitting a location update request to a target gateway to the circuit switched network determined based on the target base station identifier to maintain the circuit switched connection in the second wireless communications region.

68. The module of claim 67, wherein the information for transmitting the request to register further comprises information for including an authentication mechanism, wherein the registration message further comprises an identification mechanism using the authentication mechanism, and further comprising information executable by the processor for verifying an identity of the mobile station based on the identification mechanism and the authentication mechanism before transmitting the location update request.

69. An apparatus for wireless communications, comprising:
means for determining, by a serving controller of an interface with a packet data serving node, that a mobile station having an active packet switched connection and an established circuit switched connection has moved from a first wireless communications region to a second wireless communications region;

means for transmitting a request to register for circuit switched communications to the mobile station via a first air interface for the packet switched connection based on determining that the mobile station has moved to the second wireless communications region;

means for receiving a registration message over the first air interface from the mobile station via a target base station in response to the mobile station receiving the request, wherein the target base station comprises an identifier; and means for transmitting a location update request to a target gateway to the circuit switched network determined based on the target base station identifier to maintain the circuit switched connection in the second wireless communications region.

70. The apparatus of claim 69, wherein the means for transmitting the request to register further comprises means for including an authentication mechanism, wherein the registration message further comprises an identification mechanism using the authentication mechanism, and further comprising means for verifying an identity of the mobile station based on the identification mechanism and the authentication mechanism before transmitting the location update request.

71. An apparatus for wireless communications, comprising:
a memory comprising computer-executable instructions for:
determining, by a serving controller of an interface with a packet data serving node, that a mobile station having an active packet switched connection and an established circuit switched connection has moved from a first wireless communications region to a second wireless communications region;
transmitting a request to register for circuit switched communications to the mobile station via a first air interface for the packet switched connection based on determining that the mobile station has moved to the second wireless communications region;
receiving a registration message over the first air interface from the mobile station via a target base station in response to the mobile station receiving the request, wherein the target base station comprises an identifier; and
transmitting a location update request to a target gateway to the circuit switched network determined based on the target base station identifier to maintain the circuit switched connection in the second wireless communications region; and
a processor coupled to the memory and configured to execute the computer-readable instructions.

72. The apparatus of claim 71, wherein the instructions for transmitting the location update request further comprise instructions for transmitting via a reflector element connectable with the target gateway if the target gateway cannot be directly reached.

73. The apparatus of claim 72, further comprising computer-readable instructions for:
appending, by the reflector element, a cellular identifier to the location update request, wherein the cellular identifier is bound to the reflector element;
receiving, by the target gateway, a circuit switched network page for the mobile station; and
forwarding the page to the serving controller via the reflector element according to the cellular identifier.

74. The apparatus of claim 71, wherein the instructions for transmitting the request to register further comprise instructions for including an authentication mechanism, wherein the registration message further comprises an identification mechanism using the authentication mechanism, and further comprising instructions for verifying an identity of the mobile station based on the identification mechanism and the authentication mechanism before transmitting the location update request.

75. A method of wireless communications, comprising:
establishing, by a mobile station, a first air interface for a first packet switched connection in a first wireless communications region controlled by a first controller;
establishing, by the mobile station, a circuit switched connection in the first wireless communications region;
determining, in correspondence with detection of movement of the mobile station to a second wireless communications region, that a pilot signal strength of a target base station in the second wireless communications region exceeds a threshold;
receiving a request to register for circuit switched communications to maintain the circuit switched connection in the second wireless communications network, wherein the request is received via the first air interface for the packet switched connection from the first controller based on the detection of movement of the mobile station to a second wireless communications region while having an active packet switched connection and the established circuit switched connection; and
transmitting a registration message to the target base station in response to the mobile station receiving the request in order to maintain the circuit switched connection in the second wireless communications network.

76. The method of claim 75, further comprising receiving a circuit switched network page via the first air interface from the target base station, and tuning to a second air interface for the circuit switched connection in response to receiving the page.

77. The method of claim 75, wherein receiving the request to register further comprises receiving an authentication mechanism, wherein transmitting the registration message further comprises transmitting an identification mechanism using the authentication mechanism, wherein the registration, message is configured for verifying an identity of the mobile station based on the identification mechanism and the authentication mechanism.

78. A module for wireless communications, the module residing in a storage medium, comprising:
instructions executable by a processor for establishing, by a mobile station, a first air interface for a first packet switched connection in a first wireless communications region controlled by a first controller;
instructions executable by the processor for establishing, by the mobile station, a circuit switched connection in the first wireless communications region;
instructions executable by the processor for determining, in correspondence with detection of movement of the mobile station to a second wireless communications region, that a pilot signal strength of a target base station in the second wireless communications region exceeds a threshold;
instructions executable by the processor for receiving a request to register for circuit switched communications to maintain the circuit switched connection in the second wireless communications network, wherein the request is received via the first air interface for the packet switched connection from the first controller based on the detection movement of the mobile station to a second wireless communications region while having an active packet switched connection and the established circuit switched connection; and
instructions executable by the processor for transmitting a registration message to the target base station in response to the mobile station receiving the request in order to maintain the circuit switched connection in the second wireless communications network.

79. The module of claim 78, wherein the request to register further comprises an authentication mechanism, wherein the instructions for transmitting the registration message further comprise instructions for transmitting an identification mechanism using the authentication mechanism, wherein the registration message is configured for verifying an identity of the mobile station based on the identification mechanism and the authentication mechanism.

80. A mobile station for wireless communications, comprising:
  means for establishing, by a mobile station, a first air interface for a first packet switched connection in a first wireless communications region controlled by a first controller;
  means for establishing, by the mobile station, a circuit switched connection in the first wireless communications region;
  means for determining, in correspondence with detection of movement of the mobile station to a second wireless communications region, that a pilot signal strength of a target base station in the second wireless communications region exceeds a threshold;
  means for receiving a request to register for circuit switched communications to maintain the circuit switched connection in the second wireless communications network, wherein the request is received via the first air interface for the packet switched connection from the first controller based on the detection of movement of the mobile station to a second wireless communications region while having an active packet switched connection and the established circuit switched connection; and
  means for transmitting a registration message to the target base station in response to the mobile station receiving the request in order to maintain the circuit switched connection in the second wireless communications network.

81. The mobile station of claim 80, wherein the request to register further comprises an authentication mechanism, wherein the means for transmitting the registration message further comprises means for transmitting an identification mechanism using the authentication mechanism, wherein the registration message is configured for verifying an identity of the mobile station based on the identification mechanism and the authentication mechanism.

82. A mobile station for wireless communications, comprising:
  a memory comprising computer-executable instructions for:
    establishing, by a mobile station, a first air interface for a first packet switched connection in a first wireless communications region controlled by a first controller;
    establishing, by the mobile station, a circuit switched connection in the first wireless communications region;
    determining, in correspondence with detection of movement of the mobile station to a second wireless communications region, that a pilot signal strength of a target base station in the second wireless communications region exceeds a threshold;
    receiving a request to register for circuit switched communications to maintain the circuit switched connection in the second wireless communications network, wherein the request is received via the first air interface for the packet switched connection from the first controller based on the detection of movement of the mobile station to a second wireless communications region while having an active packet switched connection and the established circuit switched connection; and
    transmitting a registration message to the target base station in response to the mobile station receiving the request in order to maintain the circuit switched connection in the second wireless communications network; and
  a processor coupled to the memory and configured to execute the computer-executable instructions.

83. The mobile station of claim 82, further comprising a receiver configured for receiving a circuit switched network page via the first air interface from the target base station, and a transmitter configured for tuning to a second air interface for the circuit switched connection in response to receiving the page.

84. The mobile station of claim 82, wherein the request to register further comprises an authentication mechanism, wherein the registration message further comprises an identification mechanism using the authentication mechanism, wherein the registration message is configured for verifying an identity of the mobile station based on the identification mechanism and the authentication mechanism.

85. A wireless communications device, comprising:
  means for recovering information from a signal received in accordance with a first air interface on a first carrier frequency, the first air interface being associated with a first network;
  means for allowing one or more message format types associated with messages from a second network to be communicated through the first air interface, the second network being associated with a second air interface different from the first air interface and operating on a second carrier frequency different from the first carrier frequency;
  means for detecting from the recovered information a message from the second network, if the means for allowing is configured to allow a message format type of the message to be communicated through the first air interface; and
  wherein the first network comprises first and second geographic regions, and wherein the means for detecting is further configured to detect movement of the wireless communications device into the second geographic region from the first geographic region while the means for recovering is configured to recover information from the signal received in accordance with the first air interface, and further comprising a means for sending a registration request to an access network in the second geographic region to support communications with the first network, the registration request being sent through the second air interface.

86. The wireless communications device of claim 85, wherein the one or more message format types comprises one or more types of pages, wherein the message from the second network comprises a page from the second network, the wireless communications device further comprising means for communicating with the second network in response to the page in accordance with the second air interface.

87. The wireless communications device of claim 86, further comprising means for receiving a message from the first network when communicating with the second network, the message being sent through the second air interface.

88. The wireless communications device of claim 87, wherein the message from the first network comprises a first network page, the wireless communications device further comprising means for terminating communication with the second network in response to the first network page, and means for further communicating with the first network in accordance with the first air interface in response to the first network page.

89. A computer-program product comprising a computer readable medium having instructions thereon, the instructions comprising:

code for monitoring a first network in accordance with a first air interface on a first carrier frequency;

code for configuring a filtering mechanism to allow for one or more message format types associated with messages from a second network to be communicated through the first air interface, the second network being associated with a second air interface different from the first air interface and operating on a second carrier frequency different from the first carrier frequency; and code for receiving a message from the second network through the first air interface, if a message format type of the message is one of the one or more message format types configured to be allowed to be communicated through the first air interface;

wherein the first network comprises a circuit-switched network and the second network comprises a packet-switched network; and wherein the first network comprises first and second geographic regions, the computer program product further comprising code for monitoring the second network while movement of a wireless communication device into the second geographic region from the first geographic region is detected, and code for sending a registration request to an access network in the second geographic region to support communications with the first network, the registration request being sent through the second air interface.

90. The computer-program product of claim 89, wherein the code for configuring further comprises configuring to allow one or more message format types comprising one or more types of pages, and wherein the code for receiving further comprises receiving if the message format type comprises a type of page configured to be allowed to be communicated through the first air interface.

* * * * *